June 25, 1968 B. J. BEITMAN, JR 3,390,337

BAND CHANGING AND AUTOMATIC TUNING APPARATUS FOR TRANSMITTER T-PAD OUTPUT FILTER

Filed March 15, 1966 10 Sheets-Sheet 1

INVENTOR.
BERNARD J. BEITMAN, JR.
BY Alden D. Redfield
Charles M. Hogan
ATTORNEYS.

INVENTOR.
BERNARD J. BEITMAN, JR.
Alden D. Redfield
Charles M. Hogan
ATTORNEYS.

INVENTOR.
BERNARD J. BEITMAN JR.
BY Alden D. Redfield
Charles M. Hogan
ATTORNEYS.

INVENTOR.
BERNARD J. BEITMAN, JR.
BY Alden D. Redfield
Charles M. Hogan
ATTORNEYS.

INVENTOR.
BERNARD J. BEITMAN, JR.
BY Alden D. Redfield
Charles M. Hogan
ATTORNEYS.

| | RADIO SILENCE | BAND SWITCH | COARSE |
|---|---|---|---|
| TUNE-OPERATE RELAY 385 | TUNE | OPERATE | TUNE |
| TRANSMIT-RECEIVE RELAY 363 | RECEIVE | GOES TO TRANSMIT WHEN BAND SWITCH IS COMPLETE, IF PUSH-TO-TALK LINE 200 IS GROUNDED, UNTIL GROUND IS REMOVED | RECEIVE |
| LOADING SERVO INPUT SWITCH 246 | COUPLES SERVO POTENTIOMETER OUTPUT 173 TO LOADING SERVO INPUT LINE 59. SEE 173, 249, 248, 247, 59 | OPEN | COUPLES SERVO POTENTIOMETER OUTPUT 173 TO LOADING SERVO INPUT LINE 59. SEE 173, 250, 248, 247, 59 |
| NEGATIVE-BIAS DISTRIBUTOR SWITCH 253 | (1) BIASES LINE 181 FOR SERVO-POTS. SEE 254, 258, 256, 347, 181; (2) ALSO LINES 255 AND 68 FOR SERVO AMPLIFIERS VIA 257 | OPEN | (1) BIASES LINE 181 FOR SERVO-POTS. SEE 254, 258, 256, 348, 181; (2) ALSO LINES 255 AND 68 FOR SERVO AMPLIFIERS VIA 259 |
| GROUND DISTRIBUTOR SWITCH 263 | (1) GROUNDS LINE 109 TO SET UP ONE SIDE OF THE COIL OF "DECREASE CAPACITANCE" RELAY 91B. SEE 264, 265, 266, 109 | OPEN | (1) GROUNDS LINE 109 TO SET UP ONE SIDE OF THE COIL OF "DECREASE CAPACITANCE" RELAY 91B, VIA 267 |
| CAPACITOR MOTOR POWER SWITCH 322 | SETS UP LINE 306 OF POWER CIRCUIT AVAILABLE TO DRIVE CAPACITOR MOTOR 301. SEE 306, 326, 325, 323, 220. THEN REFER TO SWITCH 342 | SETS UP LINE 306 | SETS UP LINE 306 |

Fig 7

INVENTOR.
BERNARD J. BEITMAN, JR.
BY Alden D. Redfield
Charles M. Hogan
ATTORNEYS.

| | FORCE | TUNE | OPERATE |
|---|---|---|---|
| TUNE-OPERATE RELAY 385 | TUNE | TUNE | OPERATE |
| TRANSMIT-RECEIVE RELAY 363 | TRANSMIT | TRANSMIT | EITHER |
| LOADING SERVO INPUT SWITCH 246 | GROUNDS LOADING SERVO INPUT LINE 59. SEE 251, 248, 247, 59 | CONNECTS LOADING DISCRIMINATOR OUTPUT 58 TO SERVO INPUT LINE 59. SEE 58, 252, 248, 247, 59 | OPEN |
| NEGATIVE-BIAS DISTRIBUTOR SWITCH 253 | (2) BIASES LINES 255 AND 68 FOR SERVO AMPLIFIERS, VIA 260 | (2) BIASES LINES 255 AND 68 FOR SERVO AMPLIFIERS, VIA 261 | OPEN |
| GROUND DISTRIBUTOR SWITCH 263 | (2) GROUNDS LINE 143, VIA 268, TO ASSURE TRANSMIT MODE, TRANSMIT-RECEIVE RELAY 363 BEING ENERGIZED | (2) GROUNDS LINE 143, VIA 269, TO ASSURE TRANSMIT MODE, TRANSMIT-RECEIVE RELAY 363 BEING ENERGIZED | OPEN |
| CAPACITOR MOTOR POWER SWITCH 322 | OPEN | SETS UP LINE 306 | SETS UP LINE 306 VIA 324, 326, 325, 323, 220, BUT THERE IS NO POWER ON 220 AND SET-UP IS NOT SIGNIFICANT |

Fig 8

INVENTOR.
BERNARD J. BEITMAN, JR.
BY Alden D. Redfield
Charles M. Hogan
ATTORNEYS.

| | RADIO SILENCE | BAND SWITCH | COARSE |
|---|---|---|---|
| PHASING SERVO OVERRIDE SWITCH 309 | (1) GROUNDS LINE 308 AND CONTACT 99B AND LINE 88B VIA 310, 312; (2) PUTS POWER ON LINES 307 AND 108, VIA 126, 313, 311, 397 | OPEN | (1) GROUNDS LINE 308 AND CONTACT 99B, VIA 312, 310, 314; (2) PUTS POWER ON LINE 307, VIA 318, SO THAT RELAY 91B IS TRIPPED AND MOTOR 301 DRIVEN TOWARD MINIMUM CAPACITANCE |
| COMMAND SWITCH 244 | (1) READY TO ACCEPT COMMAND ON 121 TO CHANGE FREQUENCY: TO CONNECT 190 TO GROUND, VIA 186, 187, 188, 189, TO CAUSE STEPPING ACTION OF STEP MOTOR 197 | (2) READY TO ACCEPT COMMAND TO GO TO RADIO SILENCE: CONNECTING 243 TO 190, VIA 242, TO CAUSE STEPPING ACTION OF STEP MOTOR 197 | (2) READY TO ACCEPT COMMAND TO GO TO RADIO SILENCE |
| SEQUENCE SWITCH 238 | (1) READY TO ACCEPT A GROUND CONNECTION ON 190 FROM 189, VIA 186, 187, 188, TO CHANGE CONDITION TO BAND SWITCH, BY COMPLETING CIRCUIT TO RELAY 194 FOR STEP MOTOR 197, WHEN BLANKING PULSE IS APPLIED | (2) READY TO ACCEPT A GROUND CONNECTION ON 203, VIA 143, 201 AND 200, THE PUSH-TO-TALK LINE, TO CHANGE CONDITION TO COARSE | (3) READY TO ACCEPT A GROUND CONNECTION ON 226, VIA THE TIME DELAY CIRCUIT 218, WHEN THE "AND" NETWORK CLOSES BECAUSE ALL SERVO RELAYS ARE THEN RELAXED AND 219 IS GROUNDED, TO CHANGE CONDITION TO FORCE |
| POWER DISTRIBUTING SWITCH 342 | (1) PUTS POWER ON LINE 105 FOR SERVO RELAYS. SEE 126, 224, 223, 394, 105; ALSO POWERS 358 TO PUT TUNE-OPERATE RELAY 358 IN TUNE: ALSO CONNECTS 126 TO LINE 220 FOR TIME DELAY CIRCUIT 218; (2) SUPPLIES POSITIVE POTENTIAL TO SERVO-POTS AT 182, VIA 223, 350 | OPEN | (1) PUTS POWER ON LINES 105 AND 358 AND 370 AND 220, VIA 222; (2) SUPPLIES POSITIVE POTENTIAL TO SERVO-POTS AT 182, VIA 223, 351 |

Fig 9

INVENTOR.
BERNARD J. BEITMAN, JR.
BY Alden D. Redfield
Charles M. Hogan
ATTORNEYS.

| | FORCE | TUNE | OPERATE |
|---|---|---|---|
| PHASING SERVO OVERRIDE SWITCH 309 | (3) CONNECTS LINE 308 TO LINE 321, VIA 312, 310, 315. POWER CIRCUIT FOR MOTOR 301 IS COMPLETED. SEE GROUND, 87B, MOTOR 301, 88B, 99B, 308, 312, 310, 315, 321, 320, 105, 352, 223, 224, 126. MOTOR DRIVEN TOWARD MAXIMUM CAPACITANCE UNTIL ERROR INPUT FROM PHASING SERVO TAKES CONTROL | (1) GROUNDS LINE 308 AND CONTACT 99B, VIA 312, 310, 316; (2) PUTS POWER ON LINE 307 TO BIAS TRANSISTOR 64B VIA 311, 317 | OPEN |
| COMMAND SWITCH 244 | (2) READY TO ACCEPT COMMAND TO GO TO RADIO SILENCE | (2) READY TO ACCEPT COMMAND TO GO TO RADIO SILENCE | (2) READY TO ACCEPT COMMAND TO GO TO RADIO SILENCE: CONNECTS 243 TO 190, VIA 241, TO CAUSE STEPPING ACTION OF STEP MOTOR 197, IF A GROUND IS PLACED ON 243 |
| SEQUENCE SWITCH 238 | (4) READY TO ACCEPT A GROUND CONNECTION ON 237, VIA 236, WHEN RELAY 92B IS ENERGIZED, THE CIRCUIT BEING: 205, 206, 207, 208, 209, 236, TO CHANGE CONDITION TO TUNE | (5) READY TO ACCEPT A GROUND CONNECTION ON 240, VIA 225 AND THE TIME DELAY CIRCUIT 218, WHEN THE "AND" NETWORK CLOSES AND 219 IS GROUNDED, TO CHANGE CONDITION TO OPERATE | (6) READY TO ACCEPT A GROUND ON 190, FROM THE COMMAND SWITCH 244, IF A STEP TO RADIO SILENCE IS DESIRED. NOTE SET-UP OF 194, 193, 192, 191, 190, 189, 188 AND 241, 243 OR 187, 186, 121 |
| POWER DISTRIBUTING SWITCH 342 | (1) PUTS POWER ON LINES 105 AND 370, 220 AND 358, VIA 352 | (1) PUTS POWER ON LINES 105 AND 220 AND 370 AND 358, VIA 353 | OPEN |

INVENTOR.
BERNARD J. BEITMAN, JR.
BY Alden D. Redfield
Charles M. Hogan
ATTORNEYS.

Fig 10

INVENTOR.
BERNARD J. BEITMAN, JR.
BY Alden D. Redfield
Charles M. Hogan
ATTORNEYS.

United States Patent Office 3,390,337

Patented June 25, 1968

3,390,337

BAND CHANGING AND AUTOMATIC TUNING APPARATUS FOR TRANSMITTER T-PAD OUTPUT FILTER

Bernard J. Beitman, Jr., Cincinnati, Ohio, assignor to Avco Corporation, Cincinnati, Ohio, a corporation of Delaware Filed Mar. 15, 1966, Ser. No. 534,457
29 Claims. (Cl. 325—174)

ABSTRACT OF THE DISCLOSURE

This invention is a system for matching the source impedance at the driver stage of a transmitter to the load impedance of an antenna in any band within a spectrum of frequencies. Basically it comprises a T-pad filter having a selectable series input inductance parameter, a shunt capacitor and a series output inductor. Tuning, speaking broadly, is by first selecting the inductance parameter as a permutation from a plurality of lumped coils, second, adjusting the inductor approximately to the lower end of the desired band, then forcing the capacitor away from minimum value and finally adjusting the capacitor to the desired value. A first or phase sensor then detects phase error at the source output and controls a first electromechanical drive for the variable capacitor in such a way as to eliminate phase error. A second or loading sensor senses deviation away from a desired impedance ratio at the output of the source and controls a second electromechanical drive to adjust the variable inductor in such a way as to eliminate the deviation. The system is cycled in such a way that as the inductance parameter is selected in response to a first command a register stores an electrical order indicative of the desired band. Routing means responds to a second command to couple the register to the inductor drive and the routing means responds to a third command to couple the loading sensor to the inductor drive, so that the inductor drive is first driven toward a magnitude of inductance appropriate to the desired band and then maintained thereat by the loading sensor. Override means responds to the second command to cause the variable capacitor to be adjusted to minimum capacity. Another override means responsive to a command intermediate between the second and the third commands gives the capacitor an initial "shove" away from minimum capacitance. As the third command is given the phase sensor, coupled to the capacitor drive, brings the capacitor to the value of capacitance appropriate for the desired band and maintains it at such value.

The present invention relates generally to impedance-matching networks. A matching network is a combination of electrical and/or electronic elements useful in coupling a source impedance or driver output line to a load input line, for efficient energy transfer—as, for example, in coupling the output of a driving transmitter to an antenna load. The invention relates more specifically to antenna-matching networks. In the preferred embodiment herein shown, the network performs the function of impedance-matching a transmitting system to a radiating antenna over a wide spectrum of frequencies including many bands. The matching network is preset or programmed to operate in any selected band. When any mismatch is sensed in tuning to that band, the matching network automatically eliminates it.

The invention is an improvement in the art of wide-band matching networks. This field includes substantial literature, of which typical examples are United States Patent No. 3,160,832, issued Dec. 8, 1964, to Bernard J. Beitman, Jr., Loney R. Duncan, Jr., Merrill T. Ludvigson, and Donald R. Stevens, and United States Patent No. 3,117,279, issued Jan. 7, 1964, to Merrill T. Ludvigson and Virgil L. Newhouse.

The principal objects of the invention are to provide a matching network which has the following desirable characteristics: (1) it utilizes in compensatory fashion the reactance-frequency characteristics of a series-inductance input, shunt-capacitance output type of L-filter, and a shunt-capacitance input, series-inductance output type of L-filter, thereby to confine within desirable limits the variation of the resistive component of a load, as seen by a driver, over a wide spectrum of frequencies; (2) it achieves improved harmonic rejection, by exploiting the band-pass characteristics of a T-type filter network with series inductances and shunt capacitance, throughout said wide frequency spectrum; (3) in tuning, it automatically eliminates any mismatch which may develop due to a frequency change; (4) when a frequency change is ordered, the network responds quickly to adjust itself to the change.

For a better understanding of the invention, together with other objects, advantages and capabilities thereof, reference is made to the following description of the appended drawings in which:

FIGS. 1 and 2 taken together, constitute a circuit diagram, partially in block form, of a complete matching network in accordance with the invention, FIG. 1 showing the transmit-receive switching system from which the driving input is obtained, the output to the antenna, and the intervening tuning means (i.e., the principal elements of the matching network), and FIG. 2 emphasizing the condition or programming switches and showing the remainder of the system, partially in block form—FIGS. 1 and 2 having easily comprehensible interconnections as illustrated;

Figure 2:
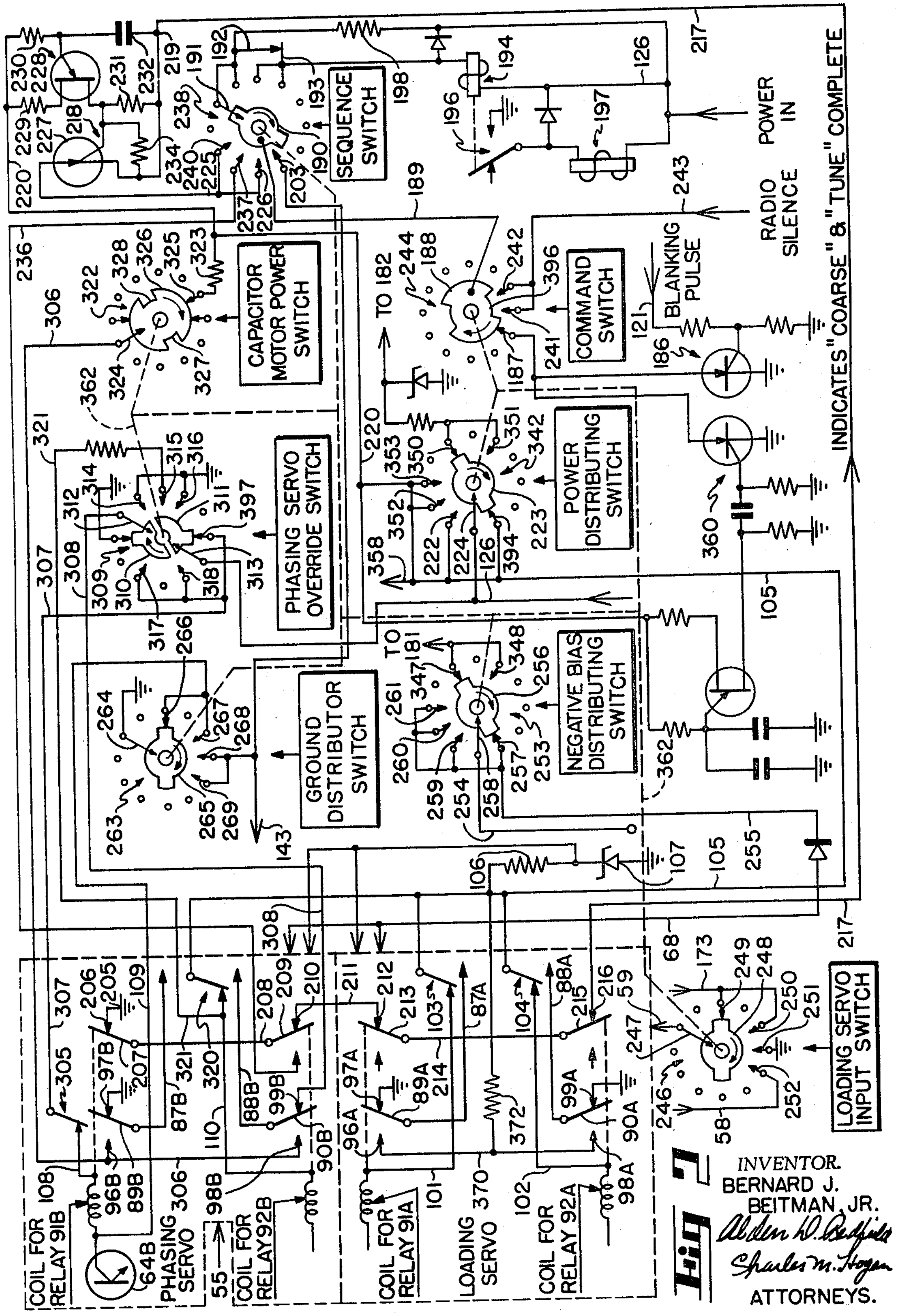
Figure 11:
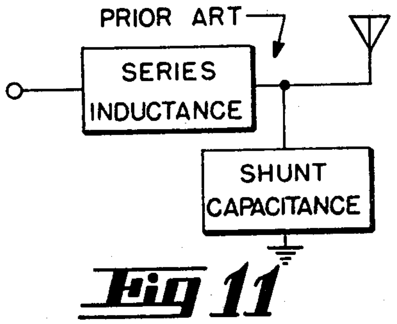
Figure 12:
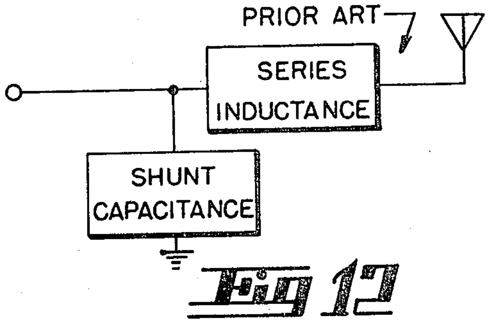
Figure 13:
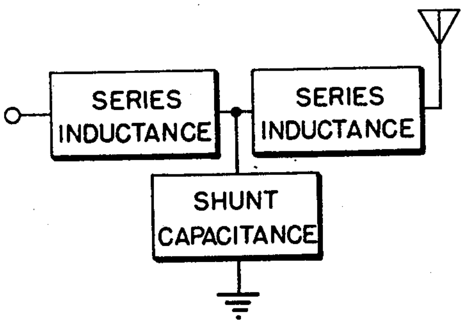
Figure 14:
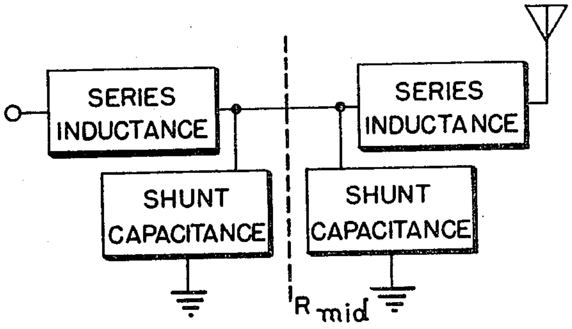
Figure 15:
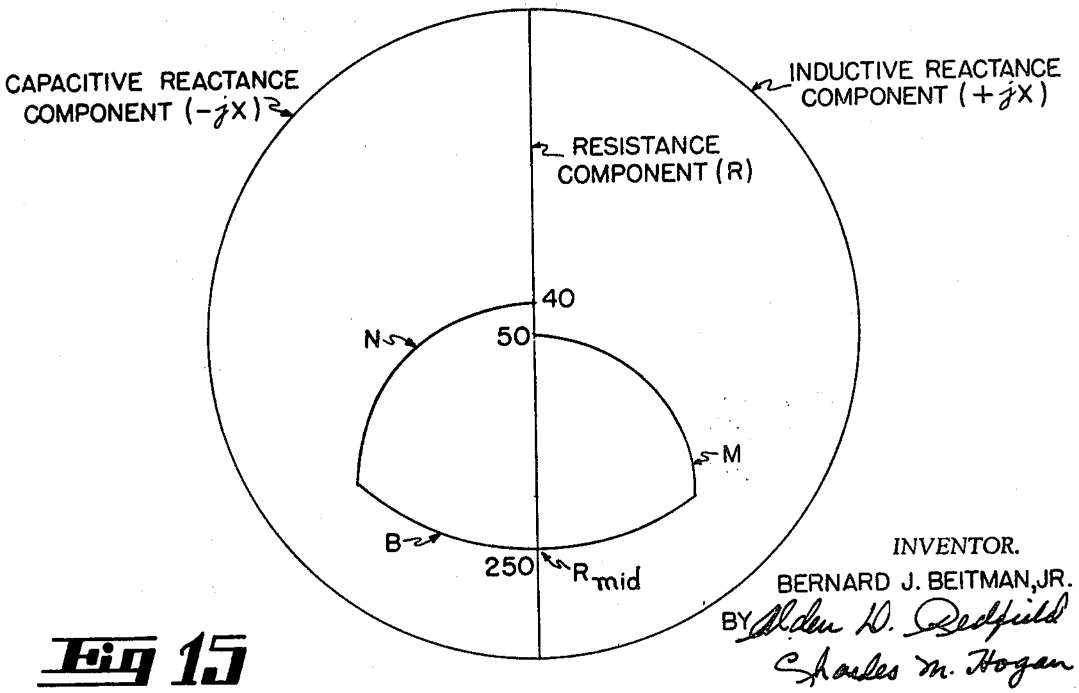

FIGS. 7, 8, 9, and 10 are charts which will be found useful in following the description of the eight condition switches illustrated in FIG. 2 and the states of those switches during the six distinct operating conditions of the matching network, FIG. 9 being a continuation of FIG. 7, FIGS. 7 and 9 relating to the conditions "Radio Silence," "Band Switch," and "Coarse," and FIG. 10 being a continuation of FIG. 8, FIGS. 8 and 10 relating to the conditions "Force," "Tune," and "Operate";

FIGS. 11 and 12 show two types of two-element L-configuration filters;

FIG. 13 shows a T-configuration filter which is exploited in accordance with the invention;

FIG. 14 is an equivalent presentation of the FIG. 13 network and is a two-stage filter combining the filters of FIGS. 11 and 12; and FIG. 15 is a fragmentary Smith chart used in explaining certain principles of the invention.

Figure 1:
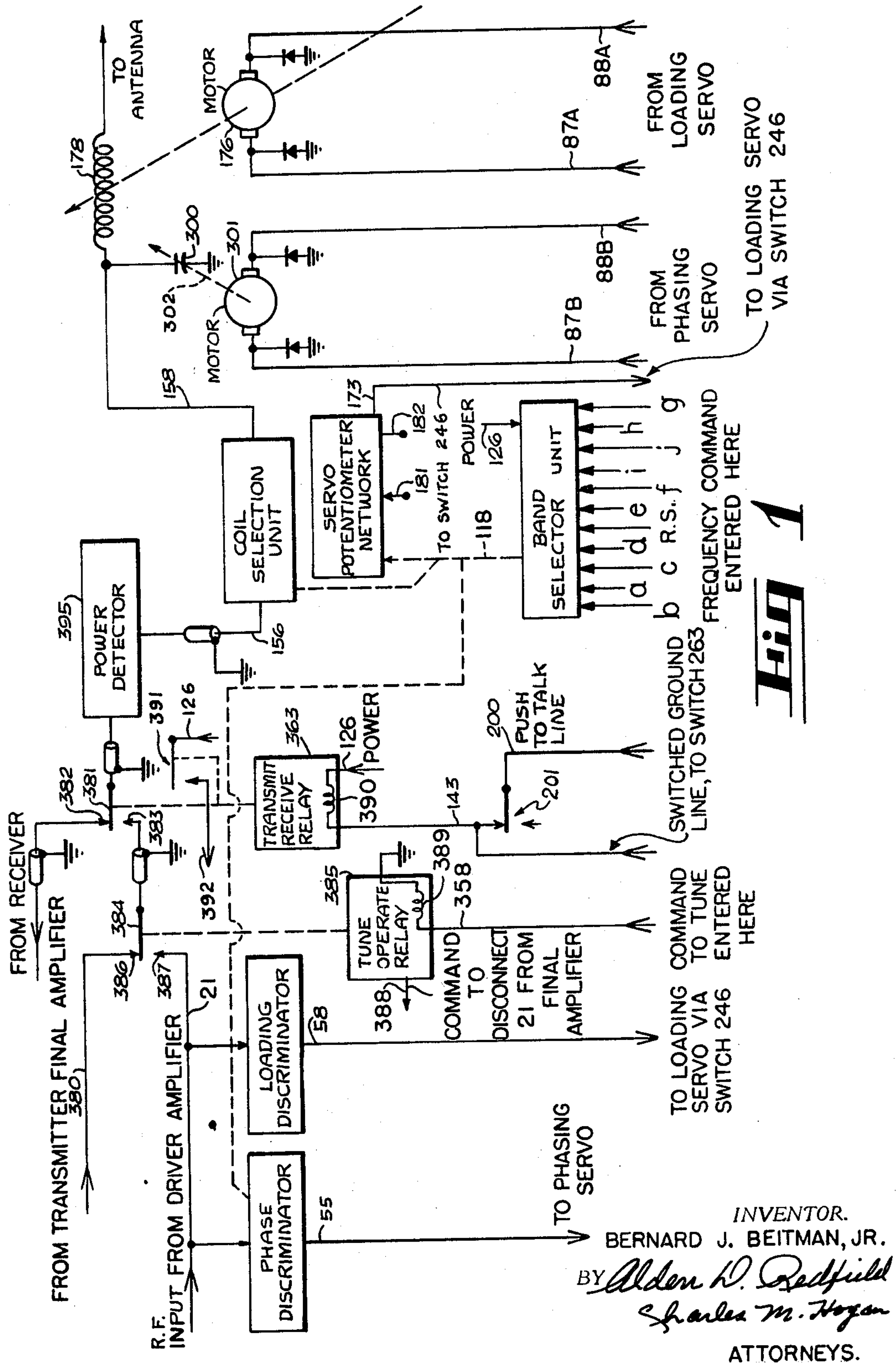

Referring now particularly to FIG. 1, the antenna network which the invention provides matches the antenna impedance to 50 ohms, for example, and provides harmonic rejection. Attention is invited to the legend "To Antenna" in the upper right side of FIG. 1. That antenna need not be shown herein, but it constitutes the load element to which the output of a driving transmitter is matched.

Attention is now invited to the legend "From Transmitter Final Amplifier" which is applied to the input line 380 in the upper left hand corner of FIG. 1. Again, the transmitter per se need not be shown, but suffice it to say that the transmitter includes a final amplifier and a driver amplifier. On tuning the matching network, the driver amplifier is used to supply drive. The transmitter is included in a transmit-receive system which also includes a receiver (not shown).

The principal elements of the antenna-matching network comprise series input inductance which in practice constitutes the content of the black box marked "Coil Selection Unit" in FIG. 1, that is to say, whatever inductor or coil, or combination of inductors or coils, i.e., whatever inductance parameter, is selected by the coil selector switches 115 and 116 (FIG. 5), dependent on the frequency band selected for operation. In other words, electrically, the Coil Selection Unit is distilled down to a selected lumped inductor or combination of inductors constituting the equivalent of a series-input inductance (FIG. 13). In series with the antenna is a high Q wide-range variable inductor 178 which will immediately be recognized as a series-output inductance of a T-pad filter network (FIG. 13.). This inductor is automatically adjusted, by means hereinafter described, in order to transform the antenna impedance to an impedance having a resistive component of the desired magnitude and a net inductive reactive component. This inductor 178 is adjusted by a reversible motor 176 (FIG. 1).

The matching network further includes a high Q wide-range variable shunt capacitor 300 (FIG. 1) which constitutes the shunt element or leg of a T-network (FIG. 13). This capacitor tunes out the net inductive reactance of the variable inductor 178 and presents a net capacitive reactance. This net capacitive reactance is resonated by the selected lumped inductor, or inductors, in the Coil Selection Unit (FIG. 1).

As will be shown hereinbelow, the function of the two band selector switches 115 and 116 is to insert between line 156 and line 158 (FIG. 1) that lumped coil, or combination of coils, i.e., that inductance parameter, appropriate to resonate the net capacitive reactance last-mentioned above.

Therefore, it will be seen that the variable inductor 178 (FIG. 1), the variable capacitor 300, and the selected lumped coil or coils in the Coil Selection Unit constitute the tuning parameters of the matching network.

During the condition which is referred to as "Radio Silence," the Coil Selection Unit is shorted out and the inductor 178 is run to its minimum inductance condition and capacitor 300 to its minimum capacitance condition, or in response to a preliminary order given by grounding line 243 (FIG. 2), so that for all practical purposes the matching network is shorted out or disabled and input 156 to the matching network is effectively connected to the antenna. The capacitor 300 then functions as an open circuit or insulator.

During the condition entitled "Band Switch" the Band Selector Unit (FIG. 1), in response to a first command, performs two principal functions: (1) it chooses that coil or combination of coils in the Coil Selection Unit which is appropriate for the band which has been ordered; and (2) it sets into a servo potentiometer network or register (FIG. 1) a band-switch command which is later utilized to drive the inductor 178 to a value appropriate for that band.

During the condition entitled "Coarse" the servo potentiometer network in response to a second command, causes motor 176 to drive inductor 178 to the predetermined position ordered by the band-switch command and, by means described hereinbelow, the motor 301 maintains the capacitor 300 in its minimum capacitance position.

In reducing the invention to practice, the desirability of a condition designated "Force" was indicated. During this condition motor 301, in response to a command intermediate between the second and third commands, is given an initial electrical "shove" to drive capacitor 300 away from its minimum capacitance position, whereupon a phasing error signal (later described) assumes control of the motor 301 and drives capacitor 300 to the position appropriate to the selected band.

During the condition entitled "Tune" a phasing discriminator or sensor senses any lag or lead between R.F. (radio frequency) voltage and current in the input to the matching network and develops an error signal which causes the motor 301 to run and the capacitor 300 to be positioned in such manner as to eliminate or correct the error and to assure that "in phase" or tuned characteristic which is indicative of a matched condition. During "Tune" the loading discriminator or sensor senses any departure from the 50-ohm load which is "seen" by the matching network and develops an error signal which causes motor 176 and inductor 178 to run in such a direction as to eliminate or correct the mismatch. These actions occur in response to a third command.

During the "Operate" condition the status of the various tuning parameters is passively maintained.

From the foregoing it will now be understood that further objects of the invention comprise the provision of control means for programming a matching network, that is, causing it automatically successively to assume its various states, on command, and providing for suitable overrides as desired.

The exposition of the invention will be aided at this point by making reference to certain relationship between the drawings, particularly FIGS. 1 and 2.

The phase discriminator output 55 in FIG. 1 is the input 55 to the phasing servo of FIG. 2. The output 58 of the loading discriminator in FIG. 1 is the input 58 to the loading servo input switch 246 of FIG. 2. The "Tune-Operate" relay output 388 is not related to any other figure. The "Tune-Operate" relay input 358 is the same as the conductor 358 which is shown near the power distributing switch in FIG. 2. The output 173 of the servo potentiometer network in FIG. 1 is an input to the loading servo input switch in FIG. 2. The inputs 87B and 88B for the phasing motor of FIG. 1 are the same as the outputs 87B and 88B of FIG. 2. The inputs for the loading motor 87A and 88A of FIG. 1 are the same as the outputs 87A and 88A of FIG. 2. The connections 181 and 182 of the servo potentiometer of FIG. 1 are the same as the correspondingly numbered connections located near the negative bias distributing switch 253 and the power distributing switch 342, respectively, of FIG. 2.

Figure 5:
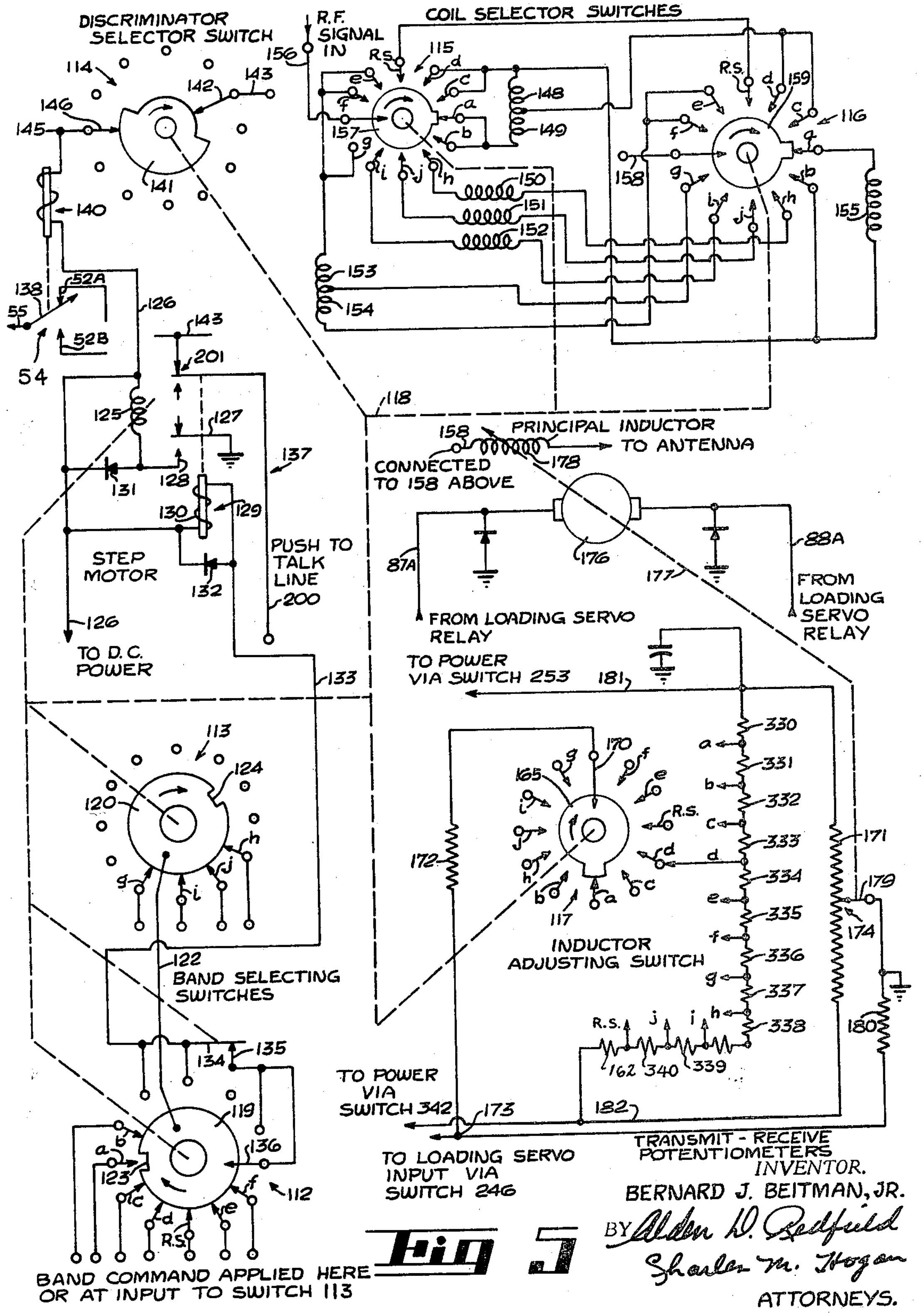
FIG. 5 is a circuit schematic of the band selector switches of the system.

The relationships between FIG. 1 and FIG. 5 are also mentioned. The Coil Selection Unit of FIG. 1 comprises the coils associated with the switches 115 and 116 of FIG. 5. The servo potentiometer network of FIG. 1 comprises the transmit-receive potentiometers of FIG. 5. The Band Selector Unit of FIG. 1 comprises the switches 112, 113, 114, 115, 116, and 117 of FIG. 5.

Figure 3:
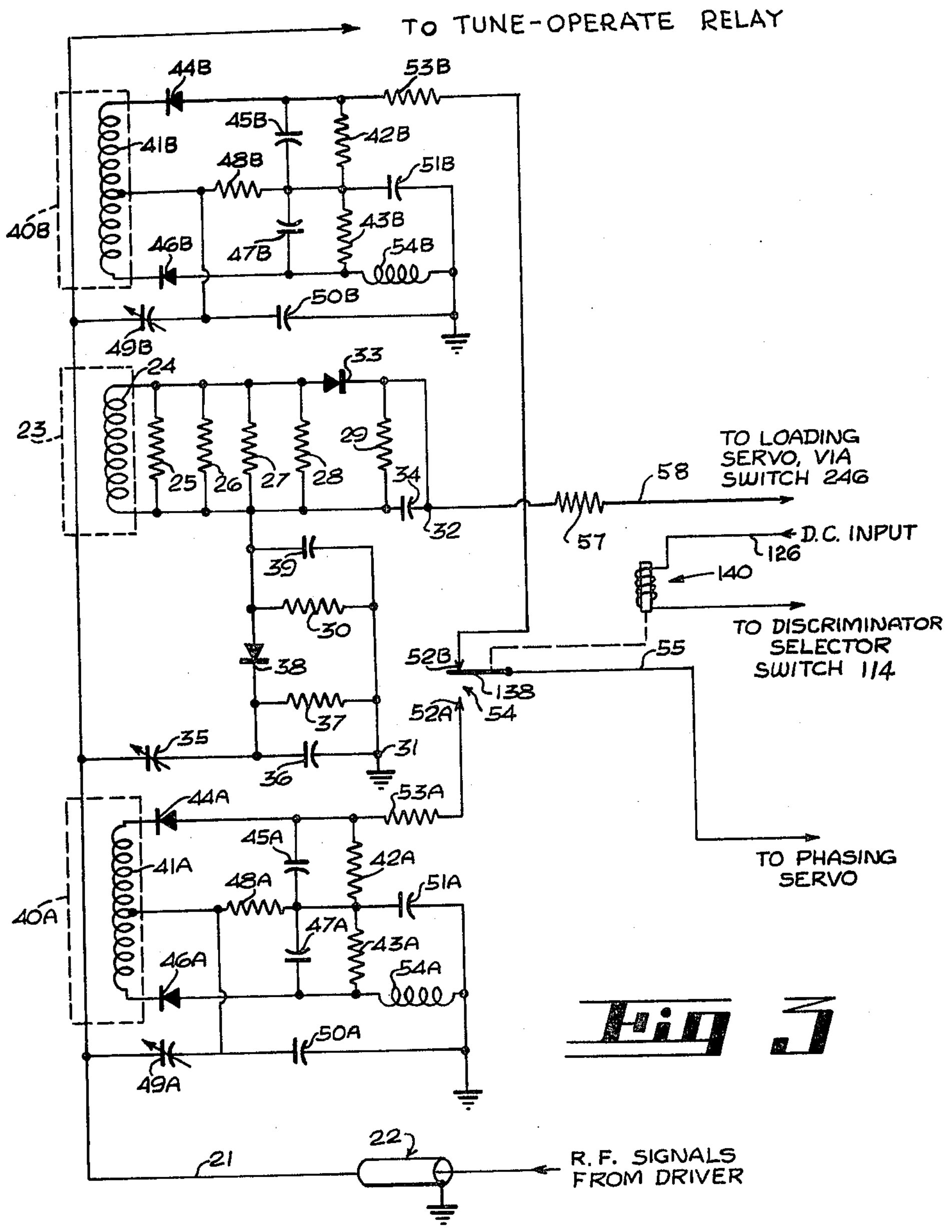
FIG. 3 is a circuit schematic of the discriminator networks employed in the matching system.

The phase discriminator and loading discriminator of FIG. 1 are detailed in FIG. 3.

Figure 4:
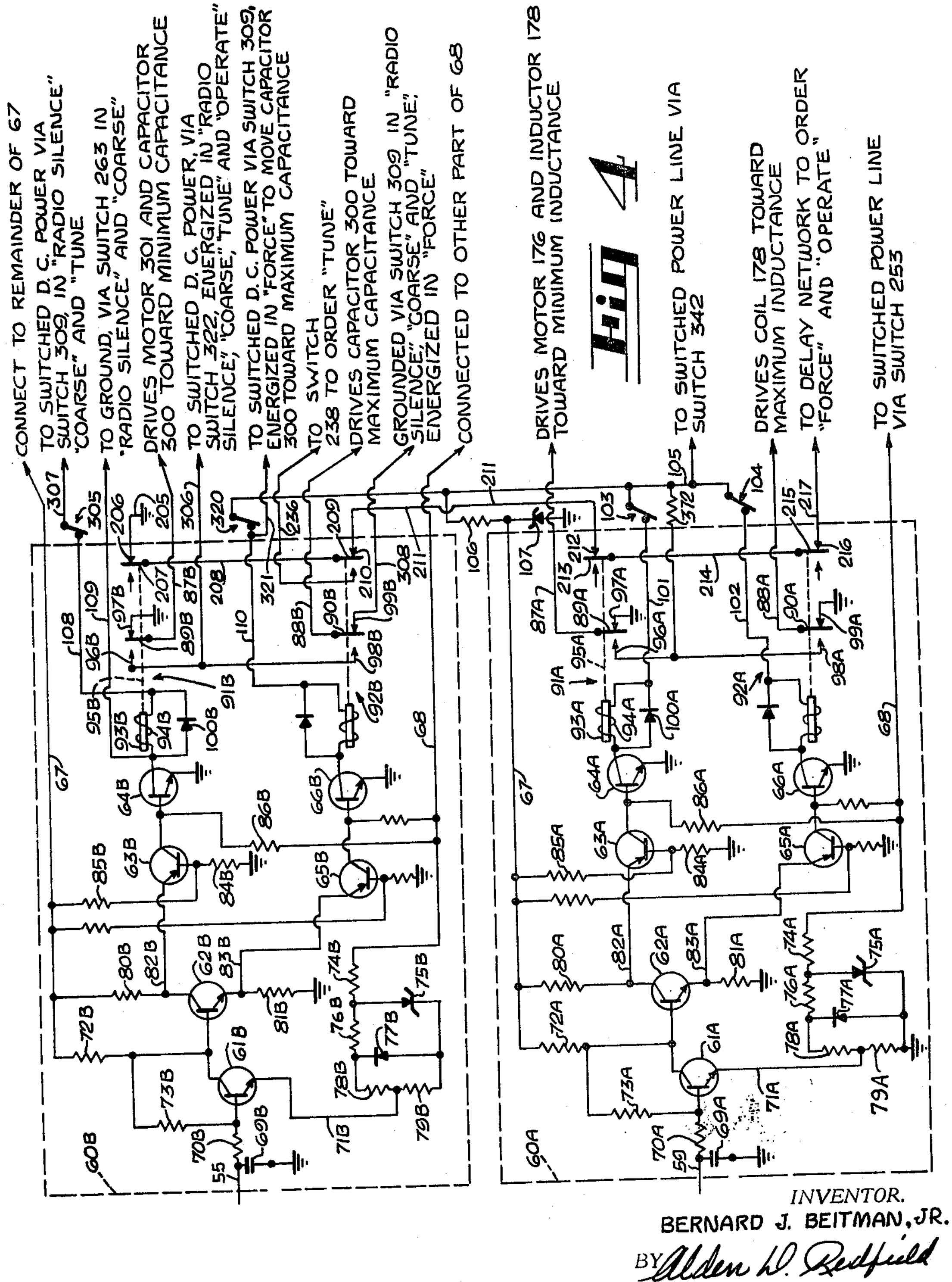
FIG. 4 is a circuit schematic of the servo amplifiers included in the system.

Only the relay outputs of the servo amplifying systems detailed in FIG. 4 are detailed in FIG. 2.

Referring again to FIG. 1, and with particular reference to the Coil Selection Unit, the variable capacitor 300, and the variable inductor 178, this filter network is essentially a T-network (FIG. 13) which substitutes one capacitor (300 in FIG. 1) for the two capacitors of a cascaded arrangement of two types of filter networks (FIG. 14) as follows: (1) a series-impedance input, shunt-impedance output filter (FIG. 11); and (2) a shunt-impedance input, series-impedance output filter (FIG. 12), the series impedances being of one kind of net reactance and the shunt impedances being of the opposite kind of net reactance. Now, a characteristic of a two-element L-filter network of the first type is that the resistive component of the impedance looking into the filter must always be smaller than the resistive component of the load impedance at the filter output. On the other hand, a characteristic of the second type of two-element L-filter network is that the resistive component of the impedance looking into the filter must always be greater than the resistive component of the load impedance at the filter output. Now, antenna impedance varies with frequency over a wide range, and if the desired antenna impedance is resistive and, say, 50 ohms, the actual resistive component of the antenna load will be considerably less than 50 ohms at low frequencies and considerably higher than 50 ohms at high frequencies. An impedance transformation network comprising a cascaded arrangement of networks of the type mentioned above will combine their characteristics in a compensatory fashion, so that the resistive component of the impedance looking into the network can be matched to the resistive component of the antenna load impedance over a wide range.

A cascaded arrangement of two filters (FIG. 14) of the type mentioned above may be made up of an input inductance parameter such as that selected by the coil selection unit (FIG. 1) and a pair of shunt capacitances and an output inductor such as 178 (FIG. 1). In accordance with the invention I utilize a single capacitor 300 (FIGS. 1 and 13) in lieu of a pair of shunt capacitances, and therefore, by providing a T-network of the character shown in FIG. 1, the advantages of combining these two L-types of filters (the FIG. 11 and FIG. 12 types) are realized, whereby the matching network matches the driver to the load over a wide band of frequencies.

The prior art affords numerous two-element L-type filter configurations of the shunt-element input, series-element output type. It also affords numerous configurations of the series-element input, shunt-element output type. In each instance the elements may both be capacitances or both be inductances, or they may be of unlike reactive nature, but, whatever they are, a two-element filter can be designed for a match between driver and load at only one frequency. A departure from that frequency will upset the match. In any event, a change of one of the elements involves a change in the other, and the constraints are such that there is no design latitude for maintaining match over a wide frequency range. However, in evolving a T arrangement in accordance with the invention (FIGS. 1 and 13), I realize all of the filtering advantages of the optimum ones of these two types of two-element L-filter networks: the series-inductance input, shunt-capacitance output type, and the shunt-capacitance input, series-inductance output type. Assuming that a single capacitor (FIG. 13) is substituted for the two shunt capacitances (of FIG. 14), then the resultant is a three-element network which is relatively free of the constraints of a two-element filter, in that a variation in one of the parameters addressed to an improvement in matching does not automatically upset or make unworkable the same or other parameters addressed to tuning, and a variation in one of the parameters addressed to tuning does not impair or render unworkable the same or other parameters addressed to matching.

It has been stated that the Coil Selection Unit (FIG. 1), the shunt capacitor 300, and the series output filter 178 are equivalent to a cascaded arrangement of two types of filters: series-inductance input, shunt-capacitance output (FIG. 11); shunt-capacitance input, series-inductance output (FIG. 12). Now, both of these types are ideally suited for harmonic rejection, both featuring shunt capacitance to ground and series inductance, wherefore it will be understood that the arrangement in accordance with the invention provides a superior degree of rejection of undesired harmonics.

Assuming that an antenna "looks like" 50 ohms and that a designer couples to the antenna a network per that shown in FIG. 12, he can make the resistive component at the filter input—i.e., the same point that constitutes the junction of the two capacitances in FIG. 14, look like a different ohmic of $R_{mid}$ value, say 250 ohms, by traversing the course M shown on the right side of the Smith chart (FIG. 15). Then, assuming further that he uses in cascade and couples to the driver a filter arrangement as shown in FIG. 11, then he can work back to approximately the same value of 50 ohms (40 ohms as shown in FIG. 15) at the driver output by pursuing the course N shown on the left side of the Smith chart (FIG. 15). The point is that the filter arrangement of FIGS. 1, 13, and 14 exploits both sides of the Smith chart.

In other words, let the antenna impedance be resistive and of a value of 50 ohms. The impedance transformation due to inductor 178 is represented by the curve on the right side of the Smith chart which slopes downwardly and to the right. The impedance transformation due to the capacitor 300 is represented by the curve moving to the left across the axis. The impedance transformation due to the Coil Selection Unit is represented by the curve that moves upwardly and to the right and back to the resistive axis, intersecting it at approximately 40 ohms. The value of $R_{mid}$ is 250 ohms. In this discussion the antenna impedance is 50 ohms and the input impedance looking into the matching network is 40 ohms. These values are furnished by way of example and not by way of limitation.

The output arm of the impedance matching network (FIG. 1 or FIG. 13) is a step-up configuration (as viewed from the antenna), so that the value $R_{mid}$ is always higher than the series combination of the resistive component of the antenna and the loss resistance of inductor 178. The value of $R_{mid}$ controls the loaded Q of both input and output arms, and therefore the amount of harmonic attenuation.

It is not necessary to hold a constant $R_{mid}$ value, and therefore the inductance in the Coil Selection Unit (FIG. 1) need not be continuously variable. Fixed band switching coils (FIG. 5) are accordingly employed, the desired value of $R_{mid}$ being obtained at the low frequency edge of each band. $R_{mid}$ goes up as the bind is traversed, which results in increasingly effective second harmonic rejection. In turning to a whip antenna, inductor 178 (FIG. 1) is run to that position at which its reactance in series with the antenna presents an impedance whose shunt resistance is equal to $R_{mid}$ and whose effective shunt reactance is inductive. Capacitor 300 is run to the point at which a portion of its capacitive reactance parallel-resonates the net parallel inductance just mentioned, and the remaining portion of its capacitive reactance shunts $R_{mid}$. The series equivalent of $R_{mid}$ and said remaining portion of the capacitive reactance is then series-resonated by the Coil Selection Unit (FIG. 1), resulting in 50 ohms at the input terminals of the matching network. In translating the antenna impedance to 50 ohms, a large portion of the Smith chart has been traversed, which means that a wide range of impedances can be matched by this network.

The description having covered the objects of the invention and the theory applied to its realization, the discussion now proceeds to the several sub-systems, to wit: the discriminators, the servo amplifiers, the band selection means, and the programming means or condition switches.

*The loading and phasing discriminators*

Reference is now made to the loading discriminator or sensor illustrated in FIG. 3. The function of the loading discriminator is to determine the deviation of the ratio between line voltage and line current from the predetermined ratio which exists when the driver "sees" the desired impedance. If the output of the driver is matched so that it is feeding into a characteristic impedance-type load, then the driver "sees" approximately a predetermined impedance, say 50 ohms, which ideally is purely resistive. In the event of a mismatch, then the driver "sees" a greater or lesser impedance load, as the case may be. The loading discriminator therefore furnishes an output which indicates a ratio, and this ratio is a measure of the impedance of the load which is seen. Therefore the loading discriminator senses the amount and magnitude of an impedance mismatch and furnishes an output error signal which is utilized as a command in causing to occur such sequence of events, hereinafter described, as to accomplish the desired match.

The output radio frequency signals of the driver are supplied through the central conductor 21 of a coaxial cable 22, the external shield of which is grounded. This central conductor functions as a primary, so that the loading discriminator is coupled to the driver line by a transformer 23 comprising conductor 21, used as a primary, and secondary 24. This secondary is paralleled by loading resistors 25, 26, 27, and 28, so selected and proportioned that the voltage developed across coil 24 is independent of the driving frequency.

Attention is now directed to the voltage divider network, comprising serially connected resistors 29 and 30 and connected between the grounded output terminal 31 of the loading discriminator and its high potential terminal 32, and this divider network will be adverted to later. Coupled to resistor 28 is a diode rectifier network comprising series diode 33, shunt detector load resistor 29, and shunt filter capacitor 34. The voltage developed across secondary 24 is rectified by rectifier diode 33, so that a direct current voltage is developed across resistor 29 which is directly proportional to the current in the transmission line. A constant impedance-frequency characteristic for the current sampling transformer 23 is maintained over the entire frequency range of the system.

Let the discussion now proceed to the other portion 30 of the voltage divider network and components immediately associated therewith. Another sample is taken from conductor 21 of the transmission line via the series arrangement of variable capacitor 35 and fixed capacitor 36, connected between element 21 and point 31. Capacitor 36 is paralleled by a resistor 37 across which there is developed a voltage that is proportional to the line voltage of the transmission line. The resistor 37 is coupled to a rectifier network comprising rectifier diode 38, shunt resistor 30, and shunt filter capacitor 39, whereby a direct current voltage is developed across resistive portion 30 of the voltage divider that is proportional to the voltage in the transmission line.

It should be noted that the high potential side of resistive portion 29 of the divider network is connected to the cathode of diode 33, while resistive portion 30 of the network is connected to the anode of diode 38, so that the direct current voltages in portions 29 and 30 of the voltage divider are differentially combined. The parameters of the loading discriminator network are so selected and arranged that the output D.C. voltage taken from the output terminals 32 and 31 is zero only when the ratio between voltage and current of the transmission line is appropriate for the matching of impedances between the driver and the load. That D.C. output voltage is positive when the load impedance exceeds 50 ohms, and negative when the load impedance is less than 50 ohms. A representative value of the desired impedance to which the driver is matched is commonly assigned as 50 ohms.

Reference is now made to the phasing discriminator or sensor illustrated in FIG. 3. The function of the phasing discriminator is to determine the direction and deviation of any lead or lag between the transmission line voltage of line 21 and the transmission line current. When the current is leading, then the load looks like a capacitive reactance to the driver. When the current is lagging, then the load looks like an inductive reactance to the driver. The function of the phasing discriminator is therefore to determine the direction and deviation of phase difference from the in-phase condition which exists when the driver is matched to the desired load impedance and there are no reflections. Under the ideal condition, when the output of the phasing discriminator is zero the driver "sees" a purely resistive load. The phasing discriminator accordingly furnishes an output error signal which is utilized as a command in causing to occur such sequence of events, hereinafter described, as to render the load substantially purely resistive. The phasing discriminator produces a positive or negative voltage output when the line current leads or lags the line voltage, and zero output when line voltage and line current are in phase.

In the particular embodiment herein shown, two phasing discriminators are employed, one for the band between 2 and 20 megacycles and the other for the band between 20 and 76 megacycles. The elements of one of these phasing discriminators accordingly bear the suffix "A," and the elements of the other bear the suffix "B." The description is confined to one, it being understood that the other is like the one described, with parameters appropriate to its frequency band.

The output signals of the driver are supplied through central conductor 21, which again functions as a primary, so that the phasing discriminator is coupled to the driver line by a transformer 40A comprising conductor 21, used as a primary, and secondary 41A. This secondary works into two rectifier networks, the output resistors of which, designated 42A and 43A, provide for differential combination of the rectified currents. The rectifiers have their cathodes connected to the end terminals of secondary 41A. One of the rectifier circuits comprises rectifier 44A, capacitor 45A, and resistor 42A. The other rectifier circuit comprises rectifier diode 46A, capacitor 47A, and resistor 43A. Between the center tap of secondary 41A and the junction of capacitors 45A and 47A is connected a resistor 48A. The transformer 40A is lightly loaded. The voltage sample appearing across secondary 41A represents line current and is 90 degrees out of phase with line current. Line voltage is sampled by a divider network comprising variable capacitor 49A and fixed capacitor 50A, connected between central conductor 21 and ground, the junction of these two capacitors being connected to the center tap of secondary 41A. The junction between output resistors 42A and 43A is R.F. grounded by a capacitor 51A, and the D.C. path between the output line 52A of the phasing discriminator and ground is completed by series filter resistor 53A, in series with that line, and choke 54A connected between resistor 43A and ground. It will be noted that the voltages across resistors 42A and 43A are in opposition, substantially cancelling each other out when the load is purely resistive. However, if the sample line current is out of phase with sample line voltage, then these two voltages will be unbalanced in a direction and by an amount dependent on the phase deviation between the samples, and accordingly an error signal will appear on output line 52A, utilized in a manner described below. Selection as between the two phasing discriminators, dependent on the operating frequency band being employed, is accomplished by a single-pole double-throw switch 54, which has an output line 55.

*The servo amplifier systems*

This section relates to FIG. 4, except as otherwise indicated.

Reference is next made to the servo amplifier circuits to which the outputs of the loading and phasing discriminators are coupled. Parenthetically, the output line of the loading discriminator is numbered 32, and this output proceeds via a resistor 57, a conductor 58, certain switch (FIG. 2) connections not presently described, and conductor 59 to the input of a loading servo amplifier network generally indicated by the reference numeral 60A (see FIG. 4). This servo amplifier network 60A and motor 176 comprise, generally speaking, an electromagnetic drive for inductor 178. Now, as to the phasing discriminators, the selected one is coupled, via double-throw single contact switch 54 (see FIG. 3) and conductor 55, to the input of a phasing servo amplifier network generally indicated by the reference numeral 60B (see FIG. 4). This amplifier network 60B and motor 301 comprise, generally speaking, an electromagnetic drive for capacitor 300. The respective functions of the two servo amplifiers 60A and 60B are to receive and to amplify the commands from the loading and phasing discriminators, respectively, and to utilize the resultant amplified signals to control the drives of motors 176 and 301, respectively (see FIG. 1). The servo amplifiers 60A and 60B are identical, and the elements of one of these accordingly bear the suffix "A" and the elements of the other the suffix "B," so that the specific description is confined to one, it being understood that the other servo amplifier is like the one described.

The servo amplifier 60A is essentially a four-stage direct current network, of which the first stage comprises amplifying transistor 61A, the second comprises phase-splitting transistor 62A, and the third and fourth are in parallel branches, one of the branches including amplifier transistor 63A and output transistor 64A, and the other of the branches including amplifier transistor 65A and output transistor 66A. Positive bias voltage is available as required on line 67, and negative bias voltage is available as required on line 68. The input to servo amplifier 60A from the loading discriminator proceeds along conductor 59 into a filter network comprising shunt or bypass capacitor 69A and series resistor 70A and thence into the base of transistor 61A, an amplifying transistor here arranged in the common-emitter configuration with its emitter negatively biased via conductor 71A and its collector positively biased by connection to line 67, through resistor 72A. A stabilizing feedback resistor 73A is provided between collector and base of transistor 61A. The negative bias for the emitter is stabilized by a double regulating network between line 68 and conductor 71A, which network comprises series filter resistance 74A, shunt Zener diode 75A, series filter resistance 76A, shunt regulator diode 77A, and a shunt voltage divider comprising the resistive elements 78A and 79A, conductor 71A being connected to their junction. The collector output of amplifying transistor 61A is directly connected to the base of phase-splitting transistor 62A, which is arranged in the common-emitter configuration, having its collector connected via resistor 80A to bias line 67 and being provided with an emitter resistor 81A connected to a point of reference potential (i.e., ground). Stage 62A, being a phase splitter, has two outputs 82A and 83A, one connected to the emitter of transistor 63A and the other connected to the emitter of transistor 65A. Since the third and fourth stage branch comprising transistors 63A and 64A is the same as the third and fourth stage branch comprising the transistors 65A and 66A, remarks applicable to one will be understood to be equally applicable to the other, with due regard to the phase opposition between the inputs 82A and 83A.

As previously indicated, the collector output 82A of the phase splitter 62A is connected to the emitter of transistor 63A. Base bias for 63A is provided by a voltage divider network between line 67 and ground, comprising resistors 84A and 85A, to the junction of which the base of transistor 63A is connected. Base bias for 65A is similarly provided.

Third and fourth stage transistors 63A and 64A comprise essentially a Darlington pair, the collector output of 63A being connected to the base input of transistor 64A, which is arranged in the common emitter configuration with its emitter connected to ground. Reverse bias for the collector of 63A is provided by resistor 86A, connected between that collector and line 68. The significant output lines of the relays controlled by the servo amplifier network 60A are here designated 87A and 88A, and they are connected to the moving contacts 89A and 90A, respectively, of relay devices generally indicated by the reference numerals 91A and 92A, respectively. The identity between these devices permits the confinement of the description to a representative one. Relay device 91A comprises a core of magnetic material 93A, a solenoid 94A, a suitable mechanical linkage indicated by the reference numeral 95A, a movable contact 89A, and fixed contacts 96A and 97A. When the relay is in the position shown, as in "Band Switch," with contacts 89A and 97A encircuited, conductor 87A is grounded, for purposes of grounding the side of motor 176 that drives 178 toward minimum inductance (see FIG. 1). On the other hand, when the relay 91A is energized so that 89A and 96A are encircuited, then the motor 176 is driven in a predetermined direction (i.e., minimum inductance for 178) via power appearing on 87A. It will now be understood that, when relay 92A so operates as to close contacts 90A and 98A, the motor 176 is caused to run in the opposite direction (see FIG. 1).

The motor is braked when the driving relay is de-energized so that both sets of contacts 90A, 99A and 89A, 97A are closed. That is to say, the over-all result of the servo amplifier network is that power on line 87A causes the motor 176 to run in one direction (to decrease the inductance of 178); similarly, power on line 88A causes the motor to run in the opposite direction (to increase the inductance of 178).

Energizing winding 94A is in series with the collector of transistor 64A and is energized by collector current flow in order to close 89A, 96A to cause the motor 176 to run. That winding is shunted by an arc-suppressing diode 100A, and solenoid 94A is in series with a line 101. Similarly, the solenoid for relay 92A is in series with a line 102, and these lines are connected to a source of positive voltage via respective limit switches 103 and 104 and a common line 105. A combination of resistor 106 and Zener diode 107 is shunted across line 105. Power line 105 is energized as required. Line 67, being connected to the junction of resistor 106 and Zener diode 107, is Zener-diode regulated. Note the resistive connection 372 between power line 105 and the contacts 96A and 98A.

The output relay arrangements of phasing servo system 60B are slightly different from those of 60A, and the differences are now described. Connected to the two terminals of solenoid 94B are lines 108 and 109. Line 108 is a switched power line, and line 109 is a switched ground line. The coil of relay 92B is in series with a line 110. The remainder of the switching arrangements are later described herein. For the present, note that contact 99B is connected to a switched line 308, and contacts 96B, 98B go to a switched power line 306.

When the error signal from the phasing discriminator which is applied to the phasing servo via line 55 causes relay 91B to be energized, contact 89B closes on contact 96B, and, if 306 is "hot," motor 301 is driven toward the minimum capacitance position for capacitor 300 (see FIG. 1) by voltage on line 87B. On the other hand, when that error signal causes relay 92B to be energized, then contact 90B closes on contact 98B, and, if 306 is "hot," the voltage on line 88B causes the motor 301 to run the capacitor 300 toward its maximum capacitance position.

When the error signal input from the loading discriminator as appearing on line 59 causes relay 91A to be energized, then contact 89A closes on contact 96A and, if line 105 is "hot," the voltage on line 87A drives the motor 176 toward the minimum inductance adjustment position for coil 178. When the error signal on line 59 causes relay 92A to be energized, then contact 90A closes on contact 98A, activating line 88A, if 105 is "hot," and causing the motor 176 to drive toward the position of maximum inductance for coil 178.

Attention is now invited to the following limit switches: (1) limit switch 305, which disconnects the "decrease capacitance" relay 91B from power line 307 when the motor 301 has placed the capacitor 300 in its minimum capacitance position; (2) limit switch 320, which disconnects relay 92B from power line 105 when motor 301 has driven capacitor 300 to its maximum capacitance position; (3) limit switch 103, which disconnects relay 91A from power line 105 when motor 176 has driven inductor 178 to its minimum inductance position; and (4) limit switch 104, which disconnects relay 92A from power line 105 when motor 176 has driven inductor 178 to its maximum inductance position.

Referring now to the conductors and switching arrangements shown at the outputs of the servo systems 60A and 60B, further explanation is in order at this point. Lines 108 and 109, which during the "Coarse" state hereinafter described energize relay coil 94B and cause the principal tuning capacitor 300 to be driven toward its position of minimum capacitance by motor 301 acting through ganging expedient 302, are first described (see FIG. 1). These two lines 108 and 109 and the limit switch 305, together with energizing and switch arrangements (later described) whereby conductors 108 and 109 are included in power and ground circuits, respectively, constitute an overriding arrangement which, during the "Coarse" condition, causes the principal capacitor 300 to be driven to its minimum capacitance position, whereupon the limit switch 305 opens and breaks the power circuit. Conductor 108 supplies collector bias for transistor 64B, being switched as required.

Referring now to the two lines marked 67, they are in essence the same conductor and are connected to the junction of elements 106 and 107 for regulated power supply purposes, supplying biasing energy for the transistors in the servo amplifiers.

When there is a voltage on line 306, line 87B is activated to drive principal capacitor 300 toward its minimum capacitance adjustment if contact 89B is closed on 96B, and line 88B is activated to drive capacitor 300 toward its maximum capacitance adjustment if contact 90B is closed on contact 98B. The conductors 87B and 88B comprise the inputs to the motor 301, and therefore the over-all primary function of the servo system 60B is to control the adjustment of capacitor 300 (see FIG. 1). Therefore this servo system is referred to herein as the "phasing servo."

When relay 91B is relaxed or de-energized, contact 89B touches contact 97B, and line 87B is grounded. When relay 92B is relaxed, contact 90B touches contact 99B, and this will ground line 88B if conductor 308 is grounded via switch 309 (FIG. 2), as in the "Radio Silence" condition, for example.

At the beginning of the condition referred to as "Force," the contact between elements 90B and 99B closes the power line 306 to the motor drive line 88B, as an override arrangement, and then the motor 301 is driven in such a direction as to increase the capacitance of capacitor 300.

Now, each one of the four relays 91B, 92B, 91A, and 92A, when de-energized or relaxed, causes to be closed its respective one of the following sets of contacts, all in series between ground 205 and line 217: 206–207, 209–210, 212–213, and 215–216. These four sets of contacts are in series and constitute a logical "AND" arrangement which puts a ground on line 217 to "tell" a time delay network 218 (see FIG. 2, later described) that both principal motors 176 and 301 have stopped and the four relays just discussed are de-energized.

Line 321 is a part of the override circuirty mentioned above for causing the motor 301 to run toward maximum capacitance position during "Force." Line 308 is available either to ground or to put power on line 88B for motor 301, as will be shown hereinafter. This leaves line 236 for consideration. This line "tells" contact 237 of switch 238 (see FIG. 2) that "Force" has been completed and that the eight ganged condition switch rotors should move to "Tune."

Line 105 is a principal switched power line for the servo amplifier system.

The servo amplifier 60A is referred to as the "loading servo" because it responds to an error signal on line 59 to drive motor 176, via line 87A, toward the minimum inductance position for inductor 178 or to drive 176 and 178, via line 88A, toward the maximum inductance position, dependent on the character of the error signal.

The lines 68 are connected together and switched, as required, into a source of negative biasing current.

The system is carefully grounded. For example, ground point 31 of FIG. 3 is connected to ground point 205 of FIG. 4.

The switches 309, 263, 322, 238, 253, and 342 referred to in the legends on FIG. 4 are shown in FIG. 2.

The lines 55, 87B, 88B, 87A, and 88A of FIG. 1 are also shown in FIG. 4.

*Band-selection*

All references in this section are to FIG. 5 unless otherwise indicated.

The description now proceeds to six ganged switches 112, 113, 114, 115, 116, 117 which include rotors angularly positioned to select any desired ones of the ten bands available in the specific embodiment herein shown. In addition to the ten band positions of those rotors, there is an additional angular position which is referred to as "Radio Silence" and described hereinbelow.

Switches 112 and 113 are essentially one switch, but they will be treated herein as separate switches for purposes of simplicity in exposition. The rotors of all of these six switches are ganged together and are angularly positioned in unison by any suitable mechanical expedient, such as a common shaft, herein referred to by the reference numeral 118.

Referring now to switch 112, which is for the low band, it includes a rotor 119 and six fixed band selector contacts which are lettered in this sequence: *b, a, c, d, e, f*. There is an additional contact between contacts *d* and *e* which is referred to by the reference letters RS indicative of "Radio Silence."

Referring now to the several vertically extending input lines connected to the contacts *b, a, c, d, e,* and *f* of switch 112, suffice it for the present to say that an indication or command is furnished on one of these lines when a given band is to be selected.

Now, switch 113 for the high band is provided with a rotor 120 and includes similar fixed selector contacts designated by the reference numerals *g, i, j,* and *h*. The various selector contacts designate frequency bands as follows (in megacycles):

| | |
|---|---|
| *a* | 2–2.8 |
| *b* | 2.8–4.2 |
| *c* | 4.2–6.4 |
| *d* | 6.4–10 |
| *e* | 10–14 |
| *f* | 14–20 |
| *g* | 20–30 |
| *h* | 30–40 |
| *i* | 40–60 |
| *j* | 60–76 |

A command is rendered by putting a ground on the contact indicative of the frequency to be used.

Rotors 119 and 120 are formed with open-circuiting notches 123 and 124, respectively, because these are follow-up switches and, when a "Band Command" appears on one of the input lines, activating one of the selector contacts *a–j*, then the six rotors are caused to be turned until they assume the angular position appropriate to the selected band, and the full response to the command and the assumption of such position is accomplished when either notch 123 or notch 124 comes into registry with that selector contact which has been actuated. This registration amounts to opening of the circuitry which drives the six rotors to the ordered or commanded position.

Now, at this point let there be considered the step-type drive for ganging element 118 and all rotors driven thereby. These are collectively referred to as the "band-selecting group." The band-selecting group is driven, one step at a time, by a stepping motor 137. This motor includes a field coil 125 which is always in circuit with a source of energy in the form of a direct current line 126. The stepping motor action is akin to that of a ratchet-and-pawl mechanism, in that it drives the band-selector group one step whenever the coil 125 is energized by grounding contact 128, but upon the completion of this step, movable contact 134 of an interrupter device is mechanically separated from fixed contact 135, and this opens the ground side of the energizing circuit for relay 129, stops the stepping motor 137, and permits the motor 137 to resume its relaxed or ready state. At this point it will be apparent that the field coil 125 of the motor is energized only when its low potential terminal is connected to ground through fixed contact 128 and movable contact 127 of relay 129. These two contacts are closed when the relay 129 is energized. Relay 129 includes a coil 130 which is energized whenever the low potential terminal of that coil is encircuited with ground, the high potential terminal of the coil 130 being connected to line 126.

Transient suppression diodes 131 and 132 are placed in parallel with coils 125 and 130, respectively. Each diode is connected in such a way that when the associated coil is energized the diode is back biased. When the coil is de-energized (i.e., its circuit is opened), the collapsing field of the coil reverses the polarity apparent at the terminals of the coil, placing the diode in the conducting mode. The diode then represents a near short circuit to the potential due to the collapsing field of the coil. The transient voltage due to the de-energization of the coil is thus greatly reduced.

The low potential terminal of relay 129 obtains its ground or circuit energizing connection via conductor 133, which is encircuited with slip contact 136 of switch 112 at all times except when the interrupter contacts 134 and 135 are open. Therefore, whenever there is a ground connection to rotor 119 or 120, which ground connection is supplied by a command on one of the selector contacts *a–j*, inclusive, the step motor 137 will be activated, and it will continue its stepping action, instantaneously interrupted at the end of each step, until the command circuit is broken by reason of the attainment by the band-selector group, including the rotors, of the desired ordered angular position, which attainment is indicated by the registry of the open-circuiting notch 123 or 124 with the selector contact involved.

While rotors 119 and 120 may be the front and back of the same metallic element, they are here shown as electrically connected together by hypothetical conductor 122 and slip contacts.

Parenthetically, "push-to-talk" line 200 is routed through a set of contacts 201 in relay 129. When a ground is placed on line 200, it advances the system from "Band Switch" to "Coarse" and actually initiates tuning.

It will be recalled that separte phasing discriminators were provided for the two groups of bands, and that the switching of the appropriate phasing discriminator to its associated servo system was controlled by the positioning of a single-pole, double-throw switch 54. This switch includes a movable contact 138 which is disclosed in contact with the low band group phasing discriminator output contact 52A.

Since the switch 54 is a simple single-pole, double-throw switch, what is indicated here is a relay 140 which is energized when the band selector group of rotors is positioned for the bands *a–f*, and which is not energized when the band selector rotors are in the positions *g–j*. When the relay 140 is energized, it throws movable contact 138 into abutment with the low band phasing discriminator output contact 52A. It will be understood that the relay 140 is energized via lines 126, 145, contact 146, the enlarged portion of rotor 141 of switch 114, contact 142 and line 143, line 143 always being in circuit with rotor 141 and being appropriately switched, as will be described below, to provide a ground connection, and contact 146 being in circuit with the enlarged portion of rotor 141 to energize relay 140 when any of bands *a–f* is the band for which the rotor position is appropriate. Therefore the switch 114 is a simple discriminator-selector device.

Now, the switches 115 and 116 select the various combinations of lumped inductances or coils which are used to resonate the impedance presented to the matching network after the principal inductor 178 and the principal tuning capacitor 300 have been adjusted. In other words, the switches 115 and 116 select and insert into the matching network coils which are appropriate to perform this function. These two switches and the associated coils 148, 155 constitute an inductance selector which responds to the first or "Band Switch" command to select the desired inductance parameters.

The radio-frequency signal input to this combination of two switches is line 156.

The output of these two switches is line 158. Lines 156 and 158 are always slip-contact encircuited with the respective switch rotors 157 and 159 of switches 115 and 116. Each of these switches has eleven angularly displaced fixed contacts which correspond to the selector contacts of switches 112 and 113, and they are accordingly so lettered. Associated with these switches are lumped inductanes or coils 148–155. Coil 155 is connected between the contacts *a* and *b* of switch 116. Coils 148 and 149 are connected in series between these two points: the electrical interconnection between contacts *c* and *d* of switch 115 and the electrical interconnection between contacts *a* and *b* of switch 115. There is a connection between the junctions of coils 148 and 149 and the electrical interconnection between contacts *d* and *c* of switch 116.

The remaining connections are as follows: coils 149 and 148 in series between *b* of 115 and *b* of 116; 150 between *h* of 115 and *h* of 116; 151 between *j* of 115 and *j* of 116; 152 between *i* of 115 and *i* of 116; 153 between *g* of 115 and *g* of 116; 153 and 154 in series between the electrical interconnection between *e*, *f*, and *g* of 115 and the electrical interconnection between *e* and *f* of 116. In the position shown—that is, the band "*a*" position (i.e., 2–2.8 megacycles)—the switches 115 and 116 in place in the matching network and utilize coils 149 and 148, and 155. In the other bands the coils set forth in the following tabulation are serially connected and utilized in the matching network:

| Position of switches 115 and 116: | Coils |
|---|---|
| *b* | 149,148 |
| *h* | 150 |
| *j* | 151 |
| *i* | 152 |
| *g* | 153 |
| *f* | 153, 154 |
| *e* | 153, 154 |
| R.S. | No coil used |
| *d* | 148 |
| *c* | 148 |

In "Radio Silence" line 156 is shorted or closed to line 158.

From the foregoing description it will be understood that the switches 115 and 116 are simply tuning inductor selectors, the coil or coils appropriate for each band being selected thereby.

The remaining member of the band-selector group positioned by the ganging element 118 is the rotor 165 of switch 117.

Now, the coil 178 is the high Q variable inductor, which inductor is adjusted in order to transform the antenna impedance to an impedance having a resistive component of the desired magnitude and a reactive component which is inductive. The input line of this coil is 158, which is the same at the output line from the rotor of switch 116. Parenthetically, the ultimate function of switch 117 is to cause inductor 178 to be properly adjusted for whatever band has been selected. In "Coarse" this inductor 178 is driven to the maximum inductance needed to tune at the lowest frequency in the selected band. The inductor 178 is coarse positioned in order to make sure that it is not inadvertently self-resonant and to force the network to pass through the fundamental tuning point before the second harmonic tuning point. This eliminates the possibility of tuning to the second harmonic. The output of the inductor 178 goes to the antenna. Inductor 178 is mechanically adjusted by a bidirectional motor 176 through a suitable mechanical expedient 177, which, for purposes later discussed, also is mechanically connected to and controls the positioning of adjustable contact 179 on a "receive" potentiometer 174. Transient suppression diodes are shown on each side of motor 176.

At this point attention is invited to the fact that the resistor 171 portion of the potentiometer is shunted by a series string of resistances 330–340 tapped at *a, b, c, d, e, f, g, h, i,* and *j* as shown. It will be understood that each of the selector contacts, *a, b,* etc., of switch 117 is connected to the associated one of these taps lattered *a–j,* inclusive, as illustrated by the connection of the *d* contact to the *d* tap. The remaining connections are not illustrated, in order to avoid undue complexity of the drawing. The slip contact 170 of switch 117 is connected, via resistor 172, to a point 173. Contact 179 is connected by a resistor 180 to the same point 173. The "receive" potentiometer 174 is the functional equivalent of the "transmit" potentiometer comprising switch 117 and the series string of resistors 330–340 with taps *a–j,* the essential difference being that the "receive" potentiometer is continuously operable and has a movable contact 179 ganged to motor 176, while the "transmit" potentiometer is operable in steps.

A "response" potential is impressed on point 173 from the sliding contact 179 on potentiometer 174. An "order" potential is applied to point 173 from contact 170 on switch 117. When these two potentials are equal in magnitude and opposite in polarity, no error signal appears at point 173. On the other hand, when one is greater or less than the other or of the wrong polarity, dependent on the position of rotor 165, then there will appear at point 173 and there will be applied to the loading servo system via switch 246 (FIG. 2) an error signal appropriate to cause motor 176 to operate, whereby the ganging element 177 positions sliding contact 179 in such a manner as to restore equilibrium to the potentiometer-type bridge formed by the resistive portion 171 and the string of resistors 330–340 across it, whereby 173 again becomes a null point. Therefore, the function performed by the inductor adjusting switch 117 is to create an unbalance or error in this bridge network, which error causes motor 176 to run in such a manner as to reposition contact 179 and restore equilibrium. Therefore there will be one "Coarse" adjustment of inductor 178 for each band, i.e., one for each of the taps on string 330–340, depending on the tap selected by positioning of rotor 165. The switch 117 and the transmit-receive potentiometers of FIG. 5 constitutes a register adapted to respond to the first or "Band Switch" command to store an electrical order indicative of the desired band.

For present purposes it suffices to point out that power is supplied to the bridge via the conductors 181 and 182. The manner in which this is accomplished is discussed later herein. A small negative voltage is placed on line 181 via switch 253 (FIG. 2) in "Radio Silence" and "Coarse." A positive voltage is placed on line 182 via switch 342 (FIG. 2) in "Radio Silence" and "Coarse."

In summary, the band selector group of rotors angularly positioned by the ganging expedient 118 includes the rotors of the band selecting switches 112 and 113, the rotor of the discriminator selecting switch 114, the rotors of the coil selecting switches 115 and 116, and the rotor of the inductor adjusting switch 117, and it will be apparent from the foregoing description how, when a band selection command is rendered at the input of switch 112 or 113, the band selector group is immediately angularly positioned in a manner which causes to be selected: the appropriate discriminator; the appropriate lumped circuit coil or coils; and, finally, the appropriate "Coarse" adjustment of the principal variable inductor 178.

In relating FIG. 5 to the system illustrated in FIG. 1, it will be understood that the Coil Selection Unit and the Servo Potentiometer Network and the Band Selector Unit of FIG. 1 constitute a functional showing of that which is illustrated in detail in FIG. 5. That is to say, the switches 115 and 116 of FIG. 5 perform the immediate function of selecting coils. The switch 117 and the "transmit" and "receive" potentiometers of FIG. 5 constitute a servo potentiometer network. Now, no discriminator selector is shown in FIG. 1 because the discriminator selector of FIG. 5 performs the simple function of selecting whichever of two phasing discriminators is appropriate for any given operating frequency, and FIG. 1 accordingly shows only one phase discriminator and assumes that the selection has been made. The switches 112 and 113 of FIG. 5 constitue the Band Selector Unit of FIG. 1.

The switched ground line 143 of FIG. 5 is connected to the line 143 shown near the ground distributor switch of FIG. 2.

The resistor 162 (FIG. 5) in the string of the transmit potentiometer (i.e., the string which includes resistors 330–340) is provided in order to cause the inductor 178 to be driven to its minimum inductance position during "Radio Silence," as described hereinafter. The terminal R.S. of resistor 162 is, of course, connected to the contact R.S. of switch 117.

*The conditions of operation and the eight condition switches*

This part of the description is desirably prefaced by a consideration of elements not yet discussed in detail but referred to in the following description of the eight ganged condition switches.

All references are presently to FIG. 1 unless some other figure is indicated.

The matching network in accordance with the present invention is preferably tuned to the output of a driver amplifier (not shown) which is included in the radio frequency transmitting source with which the invention is employed. Accordingly, the radio frequency signal on line 21 (FIG. 3) which is sampled by the discriminators represents the output of the driver amplifier in this source, and not the output of the final amplifier in the source. When the matching network is being tuned up, therefore, it is coupled to line 21, the output of the driver amplifier, and not to line 380 (FIG. 1), the output of the final transmitting amplifier (not shown). The reason for this substitution, for tuning purposes, resides in the fact that the driver amplifier in certain transceiver systems with which this matching network is usefully employed has a relatively free harmonic content. This substitution enables the matching network in accordance with the invention to be employed in over-all systems wherein the output or final amplifier is so abundant in harmonics as to present difficult and indeed practically insuperable obstacles to matching.

The matching network in accordance with the invention has transmit modes and receive modes, and it is switched between them by a relay 363, referred to as a "Transmit-Receive" relay, which has a movable contact 381 and fixed contacts 382 and 383 (FIG. 1). Now, the movable contact 381 is coupled to line 156 (the input to the switch 115 of the coil selection unit), via power detector 395. The fixed contact 382 is connected to the "receive" portion of the transceiver. Fixed contact 383 is connected to the "transmit" portion of the transceiver (i.e., either to the final amplifier or the driver amplifier) via a movable contact 384 of a relay 385 (hereinafter referred to as the "Tune-Operate" relay). Fixed contact 386 of that relay is connected by line 380 to the final transmitter amplifier (not shown), and fixed contact 387 of that relay is connected to line 21 (FIGS. 3 and 1), which is the output of the driver amplifier. When the matching network is being tuned, the driver amplifier is connected to the matching network by the contacts 384 and 387, and the output of the final amplifier is open-circuited at 386. Under normal operation of the over-all system, however, the output of the driver amplifier is connected to the final amplifier, and therefore there is need for an arrangement which will cause this connection to be made for normal operation but which will disconnect line 21 from the input of the final amplifier when the matching network is being tuned up. Data or intelligence for this purpose is sent to a relay (not shown) via a line 388.

The "Tune-Operate" relay 385 has a coil 389 in series between line 358 and ground, and this relay controls the movable contact 384 in such a manner that the matching network is coupled to the driver amplifier output line 21 for tuning purposes and to the final amplifier output line 380 for normal operation in the transmit mode. As will be seen, the switch 342 (FIG. 2) connects line 358 to power line 126 and energizes relay 385 (FIG. 1) for its "Tune" mode during the following conditions of operation: "Radio Silence," "Coarse," "Force," and "Tune." At the same time relay 385 furnishes a voltage at point 388 (FIG. 1) to operate the relay (not shown) which disconnects line 21 from the input of the final amplifier. Relay 385 is in its "Operate" mode during "Band Switch" and "Operate."

Referring now to the "Transmit-Receive" relay 363 (FIG. 1), it has a coil 390. One side of the coil is connected to power line 126, and the other side is grounded via line 143 under the following conditions: when a ground is placed on the "push-to-talk" line 200, if contacts 201 are closed (FIGS. 3–1), as in going into "Coarse"; or by ground distributor switch 263 (FIG. 2) during "Force" and "Tune."

When the "Transmit-Receive" relay 363 is energized, the operation of the over-all system is in the "Transmit" mode. When this relay is de-energized, as in "Radio Silence" and "Band Switch," the operation is in the "Receive" mode. In the "Operate" condition of the over-all system, either mode may be selected.

To assure that the final amplifier has a load during transmission, the "Transmit-Receive" relay is provided with an additional set of contacts 391, which when closed energize a power line 392 for furnishing bias to the final and driver amplifiers (not shown) only during the "Transmit" mode.

A power detector 395 is inserted in line 156 to maintain a constant forward power into the matching network, thus allowing the gain of the servo-amplifier system to be set so that small gain margin is necessary to compensate for radio frequency power variations.

Now parenthetically referring to FIG. 2, considering power inputs for the moment, a small negative voltage is present on line 254 and is placed on lines 255 and 68 and/or line 181, as desired, by negative bias distributor switch 253. The principal direct current power supply line is that numbered 126, which is always connected to the following: one side of the step-motor relay 194, one side of the coil of step motor 197, contact 224 of power distributing switch 342, contact 313 of phasing servo override switch 309, one side of coil 130 of relay 129 (FIG. 5), one side of coil 125 of stepping motor 137 (FIG. 2), one side of coil 390 of the "Transmit-Receive" relay 363 (FIG. 1), and one side of the discriminator-selector relay 140 (FIG. 5).

All references in the remaining part of this section are to FIG. 2 except as otherwise indicated.

The description now proceeds particularly to the condition switches 246 (loading servo input), 253 (negative bias distributing), 263 (ground distributor), 342 (power distributing), 309 (phase servo override), 244 (command), 322 (capacitor motor power), and 238 (sequencing), they having rotors 248, 256, 265, 223, 310–311, 188, 326, and 190, respectively. The rotors of these switches are ganged by a suitable mechanical ganging element 362 and are angularly positioned to carry out the tuning sequence of the embodiment of the invention shown. That sequence involves six angular rotor positions or steps corresponding to several conditions, as follows: (1) "Radio Silence"; (2) "Band Switch"; (3) "Coarse"; (4) "Force"; (5) "Tune"; and (6) "Operate." The ganged rotors of these switches are collectively referred to as the "condition group." Step motor 197, by positioning ganging element 362, angularly moves all of the switches in unison. While shown as separate switches for purposes of exposition, switches 342 (power distributing) and 246 (loading servo input) may be the front and back of the same switch. Switches 309 (phasing servo override) and 322 (capacitor motor power) may be similarly arranged. So too, switches 253 (negative bias distributing) and 263 (ground distributor). Finally, switches 244 (command) and 238 (sequencing) may be the front and back of the same switch.

Since switch constructions are per se well known to the prior art, parenthetical descriptions of specific contacts and other detailed constructions of the switches are sought to be minimized herein.

Reference is first made to the condition referred to as "Operate." Under this condition the band switches 115, 116 (FIG. 5) have already appropriately been set up, and the principal tuning capacitor 300 (FIG. 1) and tuning inductor 178 have already been properly adjusted and the matching network has been tuned up. The "Tune-Operate" relay 385 (FIG. 1) is de-energized for "Operate." Any commands which the system is now capable of receiving are now under the control of the operator and all components of the matching network are disconnected from power except for certain end connections of otherwise de-energizing elements. The operator can transmit or receive as he desires, simply placing a ground on the push-to-talk line 200 (FIG. 1) and line 143 to energize the "Transmit-Receive" relay 363 when he desires to transmit. As will be seen, the operator can, if he desires, introduce band information and order a frequency change. Or he can order "Radio Silence" by a command on line 243 (FIG. 2), element 241 of the command switch 244 being in contact with rotor 188.

During the "Operate" condition the following switches are simply open-circuited: 246 (loading servo input), 253 (negative bias distributor), 263 (ground distributor), 342 (power distributing), 309 (phasing servo override). Sequencing switch 238 is setting up the circuit: 194, 193, 192, 191, 190, 189, 188, and 241, 243 or 187, 186, 121. These circuits are available should the command be given either to assume the "Radio Silence" state or to tune to a new frequency.

During the "Operate" condition the position of the rotor of command switch 244 is significant in a respect now described. Bear in mind that the command switch as illustrated in FIG. 2 is in the "Radio Silence" position. In the "Operate" condition the matching system can be ordered to the "Radio Silence" state by putting a ground on the "Radio Silence" line 243, whereby contact 241 establishes a ground through the elements 188, 189, 190 of sequencing switch 238, 191, 192, 193, and 194 to cause the step rotor 197 to step until all of the eight ganged rotors are set in "Radio Silence." The circuitry just described will later be amplified in further detail, but suffice it to say for the present that a command on line 243 serves as an override which can order the matching system to change state from "Operate" to "Radio Silence."

The description now proceeds to "Radio Silence." This is a condition which is frequently required in military equipment. In FIG. 2 the eight ganged rotors are all shown in the "Radio Silence" position.

During the "Radio Silence" loading-servo input switch 246 is connecting the servo potentiometer network to the loading servo 60A (FIG. 4) via these elements (FIG. 2): 173 (FIGS. 5 and 2), 249, 248, 247, and 59. Negative bias distributor switch 253 is putting a negative biasing input on supply line 181 (FIGS. 5 and 2) for the servo potentiometer network via the following: 254 (the negative bias supply line), 258, 256, and 347; also on lines 255 and 68 for the servo amplifiers via 254, 258, 257. Power distributor switch 342 (FIG. 2) is putting a positive voltage on supply line 182 (FIGS. 5 and 2) of the servo potentiometers via the following: 126 (the principal positive power supply line), 224, 223, 350, and a resistor. Power distributor switch 342 is also placing a voltage on power line 105 for the relays of the servo amplifying system and line 358 of the "Tune-Operate" relay 385 (FIG. 1) to place the latter in "Tune," via the following: 126, 224, 223, and 394. Switch 342 also closes 126 to 220, but this is not significant. Ground distributor switch 263 is putting a ground on line 109 of relay 91B via the following: 264, 265, 266, and 109. Phasing servo override switch 309 is, via 310, 312, grounding line 308 and therefore closed contacts 99B and 90B and line 88B. Phasing servo override switch 309 is also placing power on line 307 via the elements 126, 313, 311, and 397, and accordingly is energizing line 108 for relay 91B. Therefore the "decrease capacitance" servo relay 91B is energized, encircuiting lines 87B and 306. Now, switches 342 and 322 energize line 306, via 126, 224, 223, 394, 220, 323, 325, 326, 324, and 305.

During the "Radio Silence" condition, as has been seen, lines 156 and 158 (FIG. 1) are in effect connected together, and the lumped inductances shown in FIG. 5 are in effect shorted out. Additionally, the capacitor 300 is driven to its minimum capacitance position where it is effectively an open circuit. Now the same circuitry that drives 300 to its minimum position in "Coarse" drives it to its minimum position in "Radio Silence." In "Radio Silence" relay 91A is tripped and the coil 178 is driven to its minimum position by motor 176 in this manner. The servo potentiometer output 173 being in the "Radio Silence" position at which resistor 162 furnishes a minimum inductance command (FIG. 5) and the loading servo input switch applying that command to line 59 of the loading servo amplifier input, relay 91A becomes energized, closing contacts 89A and 96A and energizing line 87A, line 88A being grounded, the inductor 178 is driven to its minimum inductance position and is essentially a short circuit. By reason of the expedients just described, the "Radio Silence" condition removes the entire matching network from the system for all practical purposes, so that in the "Receive" condition of the transmit-receive relay 363, the matching network does not operate or affect reception.

Particular attention is now directed to the command and sequencing switches 244 and 238, respectively. Note that the circuit 187, 188, 189, 190, 191, 192, 193, and the coil of relay 194 terminates at power line 126. This circuit is all set up, but the silicon-controlled rectifier 186 is an open circuit so far as completing it is concerned.

The discussion now proceeds to the facts which cause the matching system to progress from "Radio Silence" to "Band Switch."

When the operator desires to change frequency, he causes to be applied via line 121 (FIG. 2) to the gate element of a silicon-controlled rectifier 186 a synthesizer blanking pulse, and the silicon-controlled rectifier fires, effectively placing a ground on contact 187 of command switch 244. This section of the description will emphasize the command switch 244 and the sequencing switch 238, because these control the stepping action of the "condition group." Command switch 244 has a rotor 188, formed with opposed notches such as open-circuiting discontinuity 396, and fixed contacts 187, 241, and 242. Its rotor 188 is connected conductively by 189 to rotor 190 of sequencing switch 238, and therefore the ground provided by 186 and 121 and just referred to is connected to the low potential terminal of the coil of relay 194 via the following circuitry: grounding means 186, contact 187, rotor 188, conductor 189, rotor 190, slip contact 191, interrupter contact 192, and interrupter contact 193.

Since the other terminal of the coil of relay 194 is connected to power line 126, the relay 194 is energized, closing contacts 196 and placing a ground on the low potential terminal of stepping motor 197. The high potential terminal of that motor being connected to power line 126, the motor makes one step, driving the eight ganged rotors to the "Band Switch" condition.

Parenthetically, sequencing switch 238 and command switch 244 perform the function of completing various ground circuits to the step motor 197. The construction and operation of step motor 197 are generally similar to those of step motor 137 (FIG. 5) previously described. The coils of 197 and 194 are shunted by transient-suppression diodes. The sequencing switch 238 includes a rotor 190, a slip contact 191, and a plurality of fixed contacts including those numbered 203, 226, 237, and 240.

It is important to note that any breaking of the relay 194 circuit solely by reason of the opening of the interrupter contacts 192–193, which open at the completion of each step of the step motor, does not cause the rectifier 186 to be reset. This is due to the presence of holding-current resistor 198, which is small enough to sustain current through rectifier 186 but large enough to drop out relay 194 when the "Band Switch" condition is reached. There is always a holding-current circuit through 126, 198, 191, 190, and 189 to 188. This holding-current circuit is broken when the "Band Switch" condition is achieved, as when the contact 187 of command switch 244 is opposite at least a portion of discontinuity 396. The reason for the providing of holding current by resistor 198 is so that the matching network can be driven to the "Band Switch" state by a command on line 121 if a frequency change occurs during tune-up. As previously stated, once the "condition group" rotors are driven to "Band Switch," silicon-controlled rectifier 186 is reset.

The description now proceeds to the "Band Switch" condition because the eight ganged rotors have now been placed in that condition. During band switching the appropriate combination of coils 148–155 (FIG. 5) is selected and the transmitter portion of the "Coarse" positioning potentiometer network is set up by rotation of rotor 165 of switch 117 (FIG. 5). That is, one of the taps on the resistor string 339–340 is selected, depending on the frequency band chosen. This tap causes to be set up an error at 173 (FIGS. 5 and 2) which is used for "Coarse" positioning of the principal inductor.

The command on line 121 and the commands on the inputs to switches 112–113 are so coordinated that the combination of coils 148–155 is chosen during "Band Switch" as the band selector group turns to whatever position is ordered by the frequency selection command applied to switch 112 or switch 113.

At the completion of band switching the following conditions exist: The "Tune-Operate" relay 385 is in "Operate," and the "Transmit-Receive" relay 363 is in "Receive"; switches 246, 253, 342, 309, and 263 are open; capacitor motor power switch 322 is connecting line 306 to line 220; and sequencing and command switches 238 and 244 are setting up the following circuit: 238 is setting up push-to-talk line 200 (FIG. 1), contacts 201, line 143, contact 203, rotor 190, contact 191, contact 192, contact 193, and relay 194, so that as the push-to-talk line is grounded step motor 197 is actuated to move the "condition group" one step into the condition called "Coarse." Command switch 244 is still set up to permit an overriding command to be applied, via contact 242, to restore "Radio Silence" if desired.

The change from "Band Switch" to "Coarse" is made, as indicated, by reason of a ground form of command placed on the lower end of the push-to-talk line 200 (FIG. 1). This ground is not applied until band switching is complete and contacts 201 of relay 29 are closed, connecting 200 to 143. When the command is applied, the "Transmit-Receive" relay 363 is energized to place the matching system in the "Transmit" mode. As soon as the ground is removed from line 200, the "Transmit-Receive" relay returns to "Receive."

Since the eight rotors in the condition group will now assume the "Coarse" condition, upon initiation of push-to-talk, that status is now further discussed. As the rotor of sequencing switch 238 turned to "Coarse," the push-to-talk ground was removed from relay 194, and it was restored to the de-energized condition.

In the "Coarse" condition the three principal events which occur are as follows: (1) appropriate energizing voltages are applied to the servo potentiometer network and the servo amplifiers; (2) the loading servo, under the control of an error from output point 173 (FIGS. 5 and 2) of the servo potentiometer network, drives the variable inductor 178 (FIG. 1) to its "Coarse" position; and (3) the variable capacitor 300 (FIG. 1) is driven to its minimum-capacitance position by relay 91B (FIG. 2). The loading servo input control switch 246 connects the servo potentiometer output point 173 to input 59 of the loading servo, via the following circuit: 250, 248, 247, and 59, thus furnishing the servo potentiometer error signal to the loading servo input. Thus the setting of switch 117 (FIG. 5) determines the position to which inductor 178 (FIG. 1) will be driven. Switch 309, the phasing servo override switch, makes a circuit from power line 126 into line 108 for relay 91B via the following elements: 313, 311, 318, 307, and limit switch contacts 305, thus energizing relay 91B. The ground side of the relay 91B circuit, which is an overriding circuit, was completed by the ground distributor switch 263 when that switch moved into its "Coarse" position, this circuitry being closed: 109, 267, 265, 264.

Phasing servo override switch 309 puts a ground on line 308 and contact 99B and the 88B side of driving motor 301 via these circuit elements: 314, 310, 312, 303, contacts 99B and 90B, and 88B. The capacitor motor 301 is driven to its minimum position, power being placed on line 306 and accordingly on line 87B, relay 91B being energized, and the power circuit for line 306 being traced as follows: power line 126; elements 224 and 223 and 222 of power distributing switch 342; line 220; and elements 325, 326, and 324 of capacitor motor power switch 322; and finally line 306.

Negative bias distributor switch 253 is supplying a small negative bias to line 255 and accordingly to line 68 for the servo amplifying system, via the following circuit elements: 254, 258, 256, 259, 255, and 68.

Power distributor switch 342 is connecting power line 126 to the servo potentiometer network line 182 via the following circuit: 126, 224, 223, 351, 182. The same switch 342 is supplying a power connection to the power line 105 for the servo amplifying system via these elements: 126, 224, 223, 222, 105. Line 358 is "hot" and "Tune-Operate" relay 385 (FIG. 1) is in "Tune." The "Transmit-Receive" relay 363 is left in "Receive" because there is no ground on 143 or 200.

It has been stated that there is an error from the servo potentiometer network (FIG. 5) at the input 59 of the loading servo amplifier (FIG. 4). This error causes the loading servo amplifier to operate. There being power available on 370 from 105, the principal inductor 178 is driven by energizing of one of relays 91A or 92A to the maximum inductance needed to tune at the lowest frequency in the selected one of the bands designated *a–j*. Coil "Coarse" positioning in accomplished, as has been indicated, by the use of the resistor string 330–340 (FIG. 5), used with band information from switch 117 (having rotor 165) as a transmit potentiometer, and the receive potentiometer (including elements 179, 171) geared to the inductor. The inductor 178 is coarse positioned in order to make sure that it is not inadvertently self-resonant and to force the network to pass through the fundamental tuning point before the second harmonic tuning point. This eliminates the possibility of tuning to the second harmonic.

The need to pre-position the inductor 178 with respect to frequency results from these conditions:

(a) Assume the principal inductor 178 were pre-positioned to minimum inductance. As the network tuned, the inductor 178 would pass through the second harmonic tuning point before reaching the fundamental tuning point. Should the variable capacitor coincidentally arrive at the wrong point, it would be possible for the matching network to act as a doubler and be satisfied.

(b) Assume the inductor 178 were pre-positioned at maximum inductance. The inductance required to tune at the lower high-band frequencies goes parallel-resonant before the top of the high band is reached. Should the inductor 178 be beyond parallel resonance, it then introduces a capacitive error resulting in the loss of servo sense.

(c) Assume the inductor 178 were not pre-positioned. Either event (a) or (b) could happen, depending on the previously tuned frequency.

Since none of these is a satisfactory condition, the inductor 178 (FIG. 1) is placed between (a) and (b) on a per-band basis. The variable capacitor 300 is pre-positioned to its minimum capacitance value. This is done to provide the highest capacitive reactance value possible and assure the ability of the discriminators to see the load impedance.

When "Coarse" positioning is complete, the principal capacitor 300 (FIG. 1) is at minimum capacitance and the principal inductor 178 is adjusted as prescribed by the setting of rotor 165, so that the driving relays 91B, 92B, 91A, and 92A (FIGS. 4 and 2) of the servo amplifiers are relaxed.

Parenthetically, the setting up of the following circuit, later adverted to, is now mentioned: the input 220 of a time delay network 218, contact 222 of power distributing switch 342, rotor 223, contact 224, and power line 126. This circuit is referred to as the "high side of the time delay network." At this stage, point 219 in the time delay network is open-circuited, and the time delay network does not operate until 219 is grounded.

It is desirable that the initiation of "Force" be delayed to provide assurance that "Coarse" is completed, and the fact that "Coarse" is completed is electrically signified by the setting up of a logical "And" circuit (FIG. 2), located at the output of the servoamplifiers, comprising ground 205, contacts 206 and 207 of relay 91B, conductor 208, contacts 209 and 210 of relay 92B, conductor 211, contacts 212 and 213 of relay 91A, conductor 214, contacts 215 and 216 of relay 92A, and line 217. It will be noted that this circuit places a ground on input 219 of the time delay network 218. The four sets of contacts included in this logical "And" circuit are closed only when all of the four relays are relaxed or released. This arrangement assures that the eight ganged condition switches cannot move to the "Force" condition state unless or until both driving motors 176 and 301 have stopped.

As both requirements for operation of network 218 (FIG. 2) are fulfilled—i.e., the grounding of point 219 and the application of power to line 220 (the high side of the time delay network), the network 218, after a delay of approximately 50 milliseconds, operates in this fashion: The transistor 228 fires and produces a positive pulse in resistor 231, which gates silicon controlled rectifier 227 on, rendering silicon controlled rectifier 227 effectively a short circuit, which short circuit is in turn effectively applied to contact 226 of switch 238 and then, via elements 190 and 191 of sequencing switch 238 and contacts 192 and 193 to relay 194, actuating step motor 197 to drive the eight rotors of the condition group to the "Force" condition.

The discussion will now consider the principal event which occurs during the "Force" condition, the necessity for the "Force" condition, and the electrical circuit operation during the "Force" condition.

Figure 6:
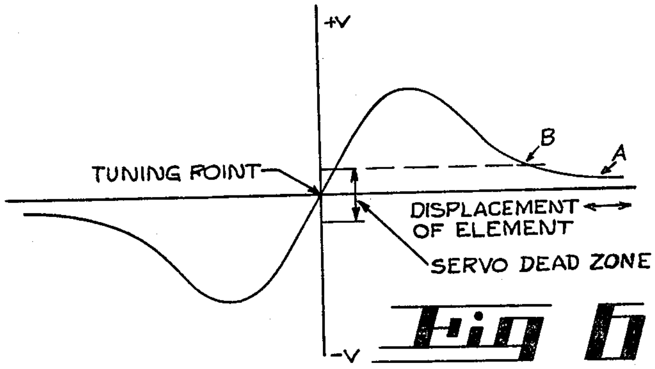
FIG. 6 is a curve used in explaining the reason for one of the several conditions of operation of the system, i.e., that referred to as "Force"

The principal event is the action of an override circuit which drives the capacitor 300 toward its maximum direction. The necessity of the "Force" condition arises from the fact that, as shown in FIG. 6, the phasing discriminator output voltage, after the "Coarse" adjustment of capacitor 300 to its minimum, is less than the amplitude of the servo system dead zone, so that unless the capacitor 300 (FIG. 1) is forced in some manner to run toward its maximum capacitance, it will not run at all. The circuit of each of the phase discriminators is somewhat similar to that of conventional frequency discriminators. Point A (FIG. 6) may represent the location of the capacitor 300 after "Coarse" adjustment. If it does, the servo-driven capacitor will not run, since the amplitude of the discriminator output voltage, at this point, is less than the amplitude of the servo dead zone. If the capacitor were forced to run toward maximum capacitance—i.e., toward point B on FIG. 6—the discriminator output voltage would start to increase, and beyond point B the dead zone of the servo would be exceeded. This is what is done in the "Force" state.

During "Force" the condition of the switches is as follows: loading servo input switch 246 is putting a ground on input 59 to the loading servo, using contacts 251, 248 and 247; capacitor motor power switch 322 is open; negative bias distributing switch 253 is putting a small negative voltage on line 68 for the servo amplifiers, using contacts 258, 256 and 260; ground distributor switch 263 is putting a ground on line 143, via 264, 265, and 268, thus keeping the Transmit-Receive relay 363 in the transmit mode; power distributor switch 342 is energizing lines 220, 105, 358, utilizing contacts 224, 223, and 352; the tune-operate relay 385 is in "Tune."

Phasing servo override switch 309 (FIG. 2) causes the driving motor 301 to drive capacitor 300 in the "increase" direction by closing this circuit: 105, 320, 321, 315, 310, 312, 308, 99B, 90B, 88B; relay contacts 89B and 97B are grounding line 87B; relay 92B is supplied with bias by 321, 110; line 307 is cold. This action is in response to a "Force" command intermediate between the second or "Coarse" command and the third or "Tune" command.

The need for "Force" arises because of the insufficiency of the error signal on output line 55 of the phasing discriminator to drive the servoamplifier and motor 301 in the "increase capacitance" direction. The override provided by the circuit 105, 320, 321, 315, 310, 312, 308 gives the servo-amplifier and motor 301 an initial "shove" in that direction until the error signal takes over and is strong enough to energize relay 92B, open contacts 99B, 90B, close contacts 90B, 98B, and drive the motor 301 to the position whereat the error signal on line 55 is reduced to zero.

Referring now to sequencing switch 238, it will be observed that the circuit to the stepping motor relay 194 is closed via 191, 190, 237, 236, 209, 208, 207, 205, whereupon the stepping motor relay 194 is activated and the step motor 197 drives the eight ganged rotors into the "Tune" position. Contact 209 was encircuited with line 236 when relay 92B was energized.

It will be noted that the step to "Tune" occurs when the phasing servo has sufficient error input to cause the servo to drive the capacitor 300 towards maximum.

Relays 363 and 385 remain energized during "Tune," connecting the antenna coupler system to the drive amplifier, and the system places the transceiver in the transmit mode. The loading discriminator (FIG. 1) generates a direct current voltage whose sense and magnitude depend upon the magnitudes of the line voltage and line current. This voltage appears on line 59 and is amplified in the loading servo amplifier 60A (FIG. 2) and applied to control relays 91A, 92A (FIG. 2) for the inductor motor 176, causing it to run until the impedance error indicates that the line impedance is 50 ohms. The output of the selected phase discriminator is a direct current voltage whose sense and magnitude are proportional to the phase angle between line voltage and line current. The phase discriminator output appears on line 55 and is amplified in the phasing servo 60B (FIG. 4) and applied to control relays 91B, 92B for the capacitor motor 301, causing it to run the capacitor 300 to that position where line current and line voltage are in phase. During tune-up the direct current output of the net forward power detector 395 (FIG. 1) at the input of the matching network is fed back to the AGC system (automatic gain control system—not shown) of the transceiver, allowing the gain of the servo amplifiers to be set so that little gain margin is necessary to compensate for radio frequency power variations.

When the matching network has completed tuning, both discriminator output voltages at 55 and 59 have nulled, and both motors 176 and 301 have stopped. The information that the motors have stopped notifies the control circuitry that tuning is complete, and the matching network advances to the "Operate" state, exactly as it advanced from "Coarse" to "Force." A typical tune time (as measured from the initiation of push-to-talk to "Operate") is four seconds.

Coupler tuning is initated after each frequency change, upon the initiation of push-to-talk (i.e., putting a ground on 200), and continues automatically, by reason of the above-described automatic stepping of the rotors of the condition group.

As to command switch 244, any one of the contacts 187, 241, and 242 is capable of making contact with rotor 188 to make the step motor 197 step if any one of said three contacts is grounded. The description has shown how a blanking pulse on 121 grounds 187 a nd initiates "Band Switch." Now, contacts 241 and 242 are so arranged as to be opposite a discontinuity such as 396 whenever the condition rotors are in "Radio Silence." In any other position of the rotor 188, at least one of the contacts 241, 242 is in contact with rotor 188 and can therefore be grounded, via a command line 243, to make the stepping motor step until it places all of the condition rotors in the "Radio Silence" condition.

Since conditions can be encountered in which the matching network will be called upon to tune but be unable to do so, the time delay circuit 360 is provided. The basic circuits 360 and 218 are substantially identical in nature and therefore in operation. The differences are:

(1) The time constant of 360 is long, on the order of 30 seconds;

(2) Circuit 360 has supply voltage applied to it whenever line 220 is energized.

When tuning commences, 360 starts timing. Should timing not be complete at the end of the prescribed time cycle (i.e., 30 seconds), 360 times out, putting a ground on 187 and advancing the condition switches to "Band Switch," forcing the initiation of another time cycle. If tuning is completed satisfactorily, circuit 360 has no effect on the operation of the coupler.

Whenever a frequency change is initiated and a command is so given that contact 187 is grounded, the command switch 244 will cause the condition rotors, if not already in that condition, to be driven into the "Band Switch" conditon.

The general function of loading-servo-input switch 246, which has a slip contact 247, a rotor 248, and fixed contacts 249–252, is to select the driving signal which is applied to the input of the loading servo system. This switch 246 is a routing means which responds to the preliminary order or "Radio Silence" to couple the servo potentiometer output 173 to the second drive. It similarly responds to the second or "Coarse" command to couple the servo potentiometer output 173 to the drive for the inductor, but in such case the output of 173 is the output appropriate to the band desired. The routing means responds to the third or "Tune" command to couple the loading discriminator output 58 to the drive for the inductor.

During the "Radio Silence" and "Coarse" conditions, the switch 246 selects the servo potentiometer signal and closes the circuit between the servo potentiometer network at 173 and the input 59 of the loading servo amplifier, via the elements 249 or 250, 248, and 247.

During the "Force" condition the input 59 to the loading servo amplifier is grounded via the elements 251, 248, 247, and 59.

During the "Tune" condition the switch 246 is connecting the loading discriminator to the loading servo system input 59, the circuit being: 59, 247, 248, 252, and 58.

During the "Band Switch" and "Operate" conditions the switch 246 is open-circuited.

The negative-bias distributing switch 253 is a simple power-saving device. In "Radio Silence" and "Coarse" its contacts 347 or 348 put a negative voltage on line 181 of the servo potentiometer network from line 254. In "Radio Silence," "Coarse," "Force," and "Tune" its contacts 257, 259, 260, and 261, respectively, put said negative voltage on line 68 for the servo amplifier systems. In "Band Switch" and "Operate" the switch 253 is open.

The general function of ground-distributor switch 263, which has a grounded slip contact 264, rotor 265, and fixed contacts 267–269, is to supply a ground connection as desired. During the "Force" and "Tune" conditions this switch puts a ground on line 143 via contacts 268 and 269, respectively, to energize the "Transmit-Receive" relay 363 and place the entire system in the transmitter mode. During the "Radio Silence" and "Coarse" conditions this line puts an overriding circuit ground on line 109 of servo relay 91B. During "Band Switch" and "Operate," switch 263 is open.

Now referring to capacitor motor power switch 322, its function is to connect line 306 to a switched power supply line 220 under all conditions except "Force," to make available driving power for motor 301. The line 220 circuit is disconnected from power during "Band Switch" and "Operate." Therefore 306 is "hot" only during "Radio Silence." "Coarse." and "Tune." It will be recalled that under the "Force" condition power applied to line 88B and motor 301 comes from line 308, but whenever this motor is run during any of the other conditions, power is applied to the motor lines 87B or 88B via line 306. Switch 322 is formed with slip contact 324 and peripheral contact 325, respectively connected to lines 306 and 220 (via resistor 323), and with a rotor 326 formed with discontinuities or circuit-breaking portions 327 and 328.

Referring now to phasing-servo override switch 309, it comprises a rotor segment 310, a rotor segment 311, a slip contact 312, a slip contact 313, and fixed contacts 314, 315, 316, 317, 397, and 318. During "Radio Silence," "Coarse," and "Tune," switch 309 puts a ground on line 308, and this ground is applied to line 88B via 99B, 90B. This permits capacitor 300 to be driven towards minimum during any of these conditions. This ground is the counterpart of that on line 87B, via 89B, 97B, when the capacitor is being driven towards maximum capacity. When switch 309 is in the "Band Switch" and "Operate" conditions, segments 310 and 311 are open-circuited.

Again directing attention to switch 309, it will be noted that contact 313 is in series with power supply line 126. During "Radio Silence" segment 311 and contact 397 therefore cause power to be available on line 307 to energize relay 91B so that capacitor 300 can be driven to its minimum capacitance position. Segment 311 and contact 318 produce the same result during "Coarse." Segment 311 and contact 317 energize line 307 during "Tune" in order to provide collector bias for transistor 64B.

From the foregoing description of the various portions of the matching network in accordance with the invention, it will be understood that FIGS. 1 and 2 represent the entire system, block diagrams being used liberally in FIG. 1 and the contents of such block diagrams being described in detail in the portions of the specification directed to the several major portions of the matching network.

While there has been shown and described what is at present considered to be the preferred embodiment of the invention, it will be understood by those skilled in the art that various modifications and changes may be made therein without departing from the scope of the invention as defined by the appended claims.

Having fully described the invention, I claim:

1. In a device for matching a driver and a load, the combination of:

first, a T-network comprising
- a series input inductance coupled to the driver and switchable in steps,
- a continuously variable series output inductor coupled to the load,
- a continuously variable shunt capacitance constituting the leg of said T-network; and second, means for maintaining a workable impedance match between driver and load over a wide spectrum of frequencies including a plurality of bands to which said steps correspond, comprising
- selector means for switching said series input inductance in steps,
- a first sensing and error-signal generating means for sensing a phase error between line current and voltage at the output of the driver,
- a second sensing and error-signal generating means for sensing a difference between an impedance ratio between line voltage and current at the output of the driver and a predetermined optimum ratio,
- first adjusting means normally controlled by the first sensing means and including a first motor and a first driving circuit for adjusting the variable capacitor to eliminate said phase error,
- and second adjusting means normally controlled by the second sensing means and including a second motor and a second driving circuit for adjusting the variable inductor to eliminate said difference, register means for storing coarse adjustment commands, and switching means for applying either the command stored in the register means or the error-signal output of the second sensing means to the second adjusting means, thereby either to make a coarse adjustment of the variable inductor or to fine-tune said variable inductor.

2. The combination in accordance with claim 1 in which the register means is further adapted to store a minimum inductance command, whereby the variable inductor can be adjusted to its minimum inductance value as a preliminary to its coarse adjustment, and band selector means for supplying to said register means coarse adjustment commands and a minimum inductance order.

3. The combination in accordance with claim 2, and first overriding means for controlling the first driving circuit to adjust the variable capacitor to minimum capacitance as a preliminary to the exercise of control by the first adjusting means.

4. The combination in accordance with claim 3, and second overriding means for controlling the first driving circuit to force the adjustment of the variable capacitor away from minimum capacitance as an aid to the initiation of control by the first adjusting means.

5. The method of adjusting a T-network—comprising a selectable set of coils providing series input inductance, a variable inductor providing series output inductance, and a variable capacitor providing shunt capacitance, said T-network being coupled between a driver and a load—to provide an impedance match between said driver and said load for any selected band in a wide spectrum of frequencies including a plurality of bands, which comprises the steps of:

first, selecting said coils in response to a command to proportion the input inductance parameter in accordance with the desired band;

second, adjusting the variable inductor in response to a command to proportion the output inductance parameter in accordance with the desired band, and simultaneously adjusting the capacitor to its minimum value;

third, sampling the signal output of the driver to develop separate error signals respectively proportional to the phase angle—between voltage and current—and the departure in impedance from that desired—as manifested by the differential in ratio between voltage and current and the desired ratio; and fourth, finally utilizing the respective error signals to control the adjustment and tuning of the variable capacitor and variable inductor to minimize said error signals.

6. The method in accordance with claim 5 in which the second step of the method there set forth is prefaced by the step of adjusting the variable inductor to its minimum value.

7. The method in accordance with claim 6 in which the additional step of forcing the capacitor away from its minimum value, until control of the capacitor adjustment is exercised by the error signals proportional to said phase angle, is inserted between the steps designated "second" and "third" in claim 5.

8. In a device for matching a driver to a load in any selected band in a wide spectrum of frequencies including a plurality of bands, the combination of:

first, a T-network comprising a switchable set of coils providing series input impedance, a variable inductor providing series output inductance, and a variable capacitor providing shunt capacitance;

second, means for selecting said coils to proportion the input inductance parameter in accordance with the desired band;

third, means for adjusting the variable inductor in response to a command to proportion its inductance parameter in accordance with the desired band;

fourth, a first override means for driving the capacitor to its minimum capacitance value as a preliminary to its final adjustment;

fifth, means for sampling the signal output of the driver to develop a first error signal proportional to the phase angle between voltage and current;

sixth, means for sampling the signal output of the driver to develop a second error signal proportional to the difference between actual impedance and that desired;

seventh, means for utilizing the first error signal finally to adjust the variable capacitor to a value at which the first error signal is substantially eliminated; and eighth, means for utilizing the second error signal to adjust the variable inductor to a value at which the second error signal is substantially eliminated.

9. The combination in accordance with claim 8, and means for driving the variable inductor to its minimum inductance value prior to its adjustment in response to a coarse adjustment command.

10. The combination in accordance with claim 9, and a second override means independent of the first-mentioned sampling means for imparting to the variable capacitor an initial forcing drive away from its minimum value as the capacitor is finally adjusted.

11. The combination in accordance with claim 10 which is characterized by:

a "Band Switch" condition in which the coils are switched as desired;

a "Coarse" condition in which the variable inductor is adjusted on command and the variable capacitor adjusted to its minimum value; and a "True" condition in which the signal outputs of the sampling means control the tuning of the variable capacitor and the variable inductor;

and means for programming the combination to assume these conditions, in sequence.

12. A coupler for matching the electrical impedance of an antenna to a driver, comprising, in combination:

an input line connected to the driver and adapted to translate signals over a spectrum of frequencies including a plurality of bands;

an output line adapted to feed said signals to said antenna;

a variable coupling circuit for coupling said input line to said output line and maintaining said match at any desired-frequency within said spectrum, said coupling circuit including:

series-connected input impedance comprising selectable coils, a series-connected output inductor, and a shunt-connected capacitor;

a phasing discriminator coupled to said input line for producing an error signal proportional to the phase angle between voltage and current;

a loading discriminator coupled to said input line for producing an error signal which is a measure of mismatch between the actual impedance measured and that desired;

a selector for selecting coils appropriate to any desired band and originating a first command;

and control means including multi-positioned switching means having successive positions which control this sequence of operation:

first, disabling said coupling circuit during a condition of Radio Silence, which is characterized by desire to permit reception and to inhibit transmission;

second, permitting the selection of said coils in response to a first command and during a band-switching condition;

third, by a second command, independent of said loading discriminator, coarse-adjusting the output inductor to a magnitude appropriate for the desired frequency, and simultaneously, independent of said phasing discriminator, adjusting the capacitor to minimum capacitance;

fourth, by a command intermediate between second and third commands, forcing the capacitor away from its minimum value;

fifth, by a third command, utilizing the discriminators severally to finally adjust and tune the capacitor and the output inductor to eliminate said error signals; and sixth, maintaining the elements of the coupling circuit in final adjustment for operation.

13. A coupler for matching the electrical impedance of an antenna to a driver, comprising, in combination:

an input line connected to the driver and adapted to translate signals over a spectrum of frequencies including a plurality of bands;

an output line adapted to feed said signals to said antenna;

a variable coupling circuit for coupling said input line to said output line and maintaining said match at any desired frequency within said spectrum, said coupling circuit including:

series-connected input impedance comprising selectable coils, a series-connected output inductor, and a shunt-connected capacitor;

a phasing discriminator coupled to said input line for producing an error signal proportional to the phase angle between voltage and current;

a loading discriminator coupled to said input line for producing an error signal which is a measure of mismatch between the actual impedance measured and that desired;

a selector for selecting coils appropriate to any desired band and originating a first command;

and control means including multi-positioned switching means having successive positions which control this sequence of operations:

first, disabling said coupling circuit during a condition of Radio Silence, which is characterized by desire to permit reception and to inhibit transmission, second, permitting the selection of said coils in response to a first command and during a band-switching condition, third, by a second command, independent of said leading discriminator, coarse-adjusting the output inductor to a magnitude appropriate for the desired frequency, and simultaneously independent of said phasing discriminator, adjusting the capacitor to minimum capacitance, fourth, by a command intermediate between second and third commands, independent of the phasing discrimintor, forcing the capacitor away from its minimum value, fifth, by a third command utilizing the discriminators severally to finally adjust and tune the capacitor and the output inductor to eliminate said error signals, and sixth, maintaining the elements of the coupling circuit in final adjustment for operation; the control means comprising:

a first motor for driving the variable capacitor, a second motor for driving the variable inductor, a first servo amplifier having a relay output and coupled between the phasing discriminator and the first motor, a second servo amplifier having a relay output and coupled between the loading discriminator and the second motor and a register in the form of a servo potentiometer network for responding to the first command to store an electrical order;

the multi-positioned switching means including a loading servo input switch for applying to the second servo amplifier either the error output of the loading discriminator or the order stored in the servo potentiometer, depending upon the magnitude of inductance to which the inductor is to be adjusted, a first overriding circuit coupled to the relay output of the first servo amplifier for executing the second command, and a second overriding circuit coupled to the relay output of the first servo amplifier for executing the intermediate command.

14. The combination in accordance with claim 13 in which the selector includes routing means for applying to the register a preliminary command that the output inductor go to its minimum value, and in which the first step in the sequence of operations is accompanied by adjustment of said output inductor to minimum inductance.

15. The combination in accordance with claim 14 in which the multi-positioned switching means includes a phasing servo override switch ganged with the loading servo input switch, and in which said phasing servo override switch selects the first and second overriding circuits.

16. The combination in accordance with claim 15 in which the multi-positioned switching means includes a condition or command-responsive sequence switch ganged with the loading servo input switch and the phasing servo override switch, together with stepping means controlled by the sequence switch for advancing the ganged switches step-by-step, the positions of the ganged switches corresponding to the six steps of the sequence of operations.

17. The combination in accordance with claim 16, a receiver, and means for coupling the input line selectively either to said receiver or to said driver, the driver being a transmitter.

18. The combination in accordance with claim 17 and including first, second, third, fourth, fifth, and sixth circuit-completing means for completing an energizing circuit to the stepping means through the sequence switch for advancing the ganged switches to succeeding positions.

19. The combination in accordance with claim 18 in which each circuit-completing means provides a ground connection.

20. The combination in accordance with claim 19 in which the first ground connection is provided in response to a blanking pulse, the second ground connection is provided by a circuit-closer designated "push-to-talk," the third ground connection is supplied when the relay outputs of the servos are relaxed following coarse adjustment of said variable inductor, the fourth ground connection is supplied when the first servo amplifier relay output is activated by the second overriding circuit to drive the capacitor toward maximum capacitance, the fifth ground connection is supplied at a predetermined time following the tuning of the variable inductor and the variable capacitor, and the sixth ground connection is supplied at the will of an operator when the condition of silence is desired.

21. The combination in accordance with claim 20 in which the multi-positioned switching means includes a command switch ganged with the loading servo input switch and the phasing servo override switch and the sequence switch for responding to a command by the operator to activate the stepping means to the position of silence.

22. In a device for matching a driver and a load, the combination of:

first, a filter network between said drive and load comprising a plurality of lumped inductances, a continuously variable inductor, a continuously variable capacitance and second, means for maintaining a workable impedance match between driver and load over a wide spectrum of frequencies including a plurality of bands to which said steps correspond, comprising selector means for selecting a permutation among said lumped inductances, a first sensing and error-signal generating means for sensing a phase error between line current and voltage at the output of the driver, a second sensing and error-signal generating means for sensing a difference between an impedance ratio between line voltage and current at the output of the driver and a predetermined optimum ratio, first adjusting means normally controlled by the first sensing means and including a first motor and a first driving circuit for adjusting the variable capacitor to eliminate said phase error, and second adjusting means normally controlled by the second sensing means and including a second motor and a second driving circuit for adjusting the variable inductor to eliminate said difference.

register means for storing coarse adjustment commands, and switch means for applying either the command stored in the register means or the error signal output of the second sensing means to the second adjusting means, thereby either to make a coarse adjustment of the variable inductor or to fine-tune said variable inductor.

23. The combination in accordance with claim 22 in which the registering means is further adapted to store a minimum inductance command, whereby the variable inductor can be adjusted to its minimum inductance value as a preliminary to its coarse adjustment, and band selector means for supplying to said register means coarse adjustment commands and a minimum inductance order.

24. The combination in accordance with claim 23, and first overriding means for controlling the first driving circuit to adjust the variable capacitor to minimum capacitance as a preliminary to the exercise of control by the first adjusting means.

25. The combination in accordance with claim 24, and second overriding means for controlling the first driving circuit to force the adjustment of the variable capacitor away from minimum capacitance as an aid to the initiation of control by the first adjusting means.

26. In an electrical device for matching a source impedance to a load impedance in any band within a spectrum of frequencies, the combination of:

an inductance selector, including a plurality of lumped inductances, and responsive to a first command for selecting from among such inductances that inductance parameter which is appropriate to the desired band, a variable capacitor, a variable inductor, said inductance parameter and said capacitor and said variable inductor being connected and arranged as a filter network, a first sensor comprising first signal generating means for sensing and generating first electrical signals to correct a phase error between line current and voltage at an output of the source.

a second sensor comprising second signal generating means for sensing and generating second electrical signals to correct a difference between an impedance ratio between line voltage and current at said output of the source and a predetermined optimum ratio, a first electromechanical drive for the variable capacitor, said first sensor being coupled to said first drive, a second electromechanical drive for the variable inductor, a register adapted to respond to said first command to store an electrical order indicative of the desired band, and routing means responsive to a second command for coupling said resistor to said second drive, and to a third command for coupling said second signal generating means to said second drive, whereby said variable inductor is first driven toward a magnitude of inductance appropriate to the desired band and is automatically maintained at the desired magnitude by the second sensor.

27. The combination in accordance with claim 26 in which the variable inductor is driven, in response to the third command, to the lower end of the desired band.

28. The combination in accordance with claim 27 and an override means responsive to the second command for forcing the variable capacitor to be driven into minimum capacitance position.

29. The combination in accordance with claim 28 and a second override means responsive to a command intermediate between the second and third commands for forcing the capacitor to be driven away from its minimum magnitude toward a magnitude of capacitance appropriate to the desired band whereat it is automatically maintained by the first sensor.

References Cited

UNITED STATES PATENTS

| | | | |
|---|---|---|---|
| 1,998,322 | 4/1935 | Kaar | 325—127 |
| 2,745,067 | 5/1956 | True et al. | 325—177 X |
| 2,824,220 | 2/1958 | Epperson | 334—21 X |
| 2,855,508 | 10/1958 | Barlow et al. | 325—172 X |
| 2,981,902 | 4/1961 | Familier | 333—17 |
| 3,271,684 | 9/1966 | Simon | 325—175 |

ROBERT L. GRIFFIN, *Primary Examinre.*

B. V. SAFOUREK, *Assistant Examiner.*

UNITED STATES PATENT OFFICE
CERTIFICATE OF CORRECTION

Patent No. 3,390,337 June 25, 1968

Bernard J. Beitman, Jr.

It is certified that error appears in the above identified patent and that said Letters Patent are hereby corrected as shown below:

Column 5, line 73, "of" should read -- or --. Column 6, line 35, "bind" should read -- band --. Column 14, line 23, "junctions" should read -- junction --; line 34, cancel "in", first occurrence; line 65, "at" should read -- as --. Column 15, line 13, "lattered" should read -- lettered --; line 50, "constitutes" should read -- constitute --. Column 16, line 13, "constitue" should read -- constitutes --. Column 17, line 68, "phase" should read -- phasing --. Column 21, line 63, "in" should read -- is --. Column 24, line 20, "initated" should read -- initiated --; line 29, "a nd" should read -- and --. Column 25, line 36, '"Radio Silence."' and '"Coarse."' should read -- "Radio Silence," -- and -- "Coarse," --. Column 27, line 74, '"True"' should read -- "Tune" --. Column 28, line 25, "oppropriate" should read -- appropriate --. Column 29, line 11, "leading" should read -- loading --; line 18, "discrimintor" should read -- discriminator --. Column 30, line 59, "switch" should read -- switching --; line 66, "registering" should read -- register --. Column 32, line 2, "resistor" should read -- register --.

Signed and sealed this 16th day of December 1969.

(SEAL)
Attest:

EDWARD M.FLETCHER,JR.
Attesting Officer

WILLIAM E. SCHUYLER, JR.
Commissioner of Patents